United States Patent [19]

Hamilton

[11] Patent Number: 4,913,458
[45] Date of Patent: Apr. 3, 1990

[54] SURVEILLANCE VEHICLE CONTROL SYSTEM

[76] Inventor: Mark L. Hamilton, 5154 Camino Del Norte, Sierra Vista, Ariz. 85635

[21] Appl. No.: 207,697

[22] Filed: Jun. 16, 1988

Related U.S. Application Data

[63] Continuation-in-part of Ser. No. 855,834, Apr. 24, 1986, Pat. No. 4,815,757.

[51] Int. Cl.[4] .................................................. B60S 9/00
[52] U.S. Cl. ...................................... 280/6.1; 52/118; 212/189; 280/764.1; 358/108
[58] Field of Search ............ 280/6 R, 6 H, 6.1, 764.1; 352/132; 354/81; 358/108; 52/115, 116, 118; 212/189

[56] References Cited

U.S. PATENT DOCUMENTS

| | | | |
|---|---|---|---|
| 1,276,825 | 8/1918 | Swope | 191/12.2 R |
| 2,719,471 | 10/1955 | Aspden et al. | 280/79.2 |
| 2,854,252 | 9/1958 | McLerran | 280/6 R |
| 3,523,698 | 8/1970 | Bishop | 280/766.1 |
| 3,738,502 | 6/1973 | Noller | 212/189 |
| 4,445,588 | 5/1984 | Truninger | 280/763.1 |
| 4,512,589 | 4/1985 | Ambrose et al. | 280/6 R |
| 4,593,474 | 6/1986 | Mayhew | 280/764.1 |
| 4,597,584 | 7/1986 | Hanser | 280/6 R |
| 4,632,261 | 12/1986 | Cuhel | 212/189 |

FOREIGN PATENT DOCUMENTS 124268 3/1919 United Kingdom ................. 52/118

Primary Examiner—Charles A. Marmor
Assistant Examiner—Eric Culbreth
Attorney, Agent, or Firm—Cort Flint

[57] ABSTRACT

A control system for a surveillance vehicle (V) is disclosed. The vehicle includes a rapid deployment and retraction mechanism (A') and a jack system (B') for continuously maintaining a detection device (28) a top a mast (12) within a prescribed vertical condition when extended. The control system includes a jack leveling logic circuit (C), a jack pressure control circuit (D), a ram control circuit (E), and a mast control circuit (F). Ram control circuit (E) controls a ram (52, 54, 56) which deploys and retracts mast (12). Jack pressure control circuit (D) senses the pressure on jacks (142a, 142b, 142d) at the four corners of the vehicle. Jack leveling logic circuit (C) receives pressure signals representing the pressure on the jacks and controls extension and retraction of the jacks in pairs at diagonal corners to maintain the vehicle within prescribed leveling conditions and to prevent the over extension or over adjustment under certain unleveling conditions. Mast control circuit (F) receives a signal representing the level condition of the vehicle so that the mast is extended and retracted only under prescribed leveling conditions.

42 Claims, 16 Drawing Sheets

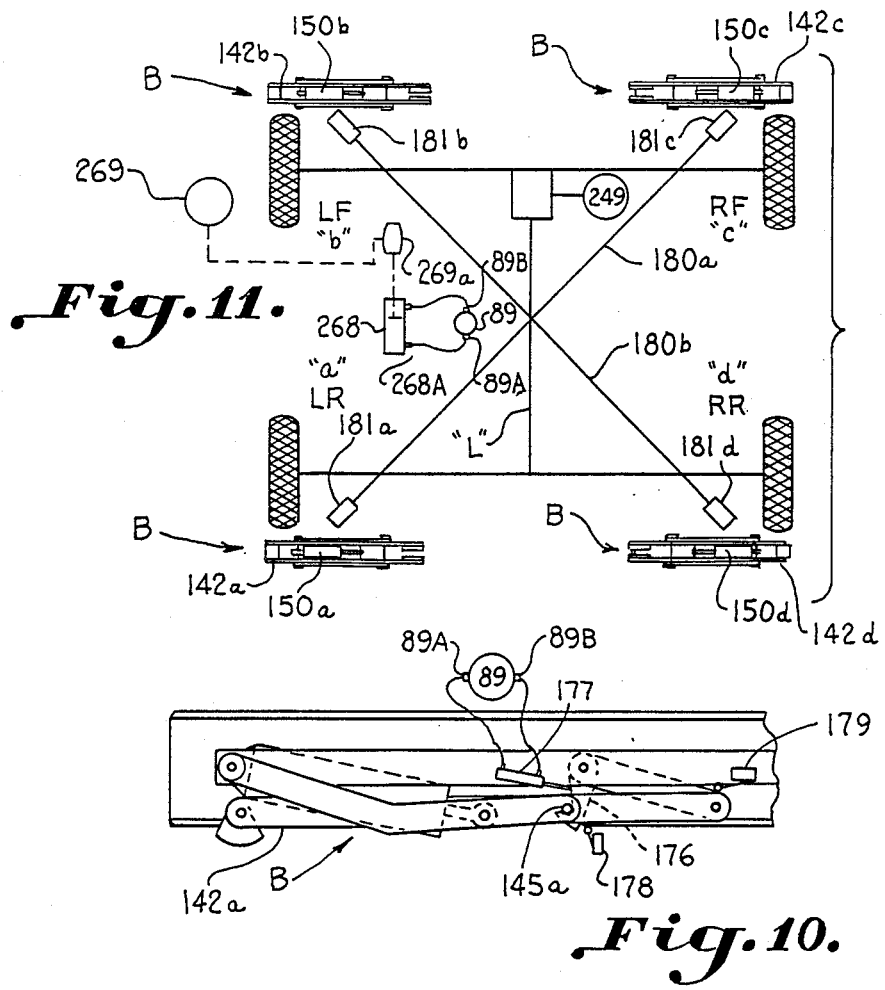
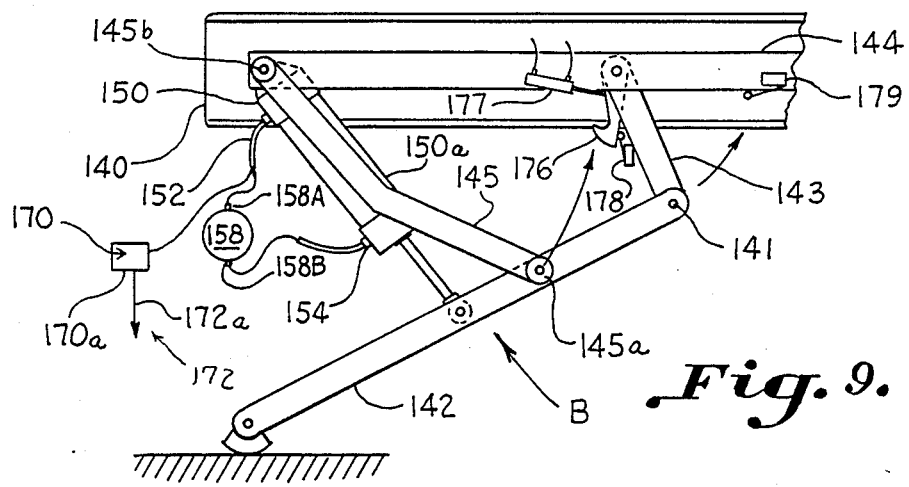

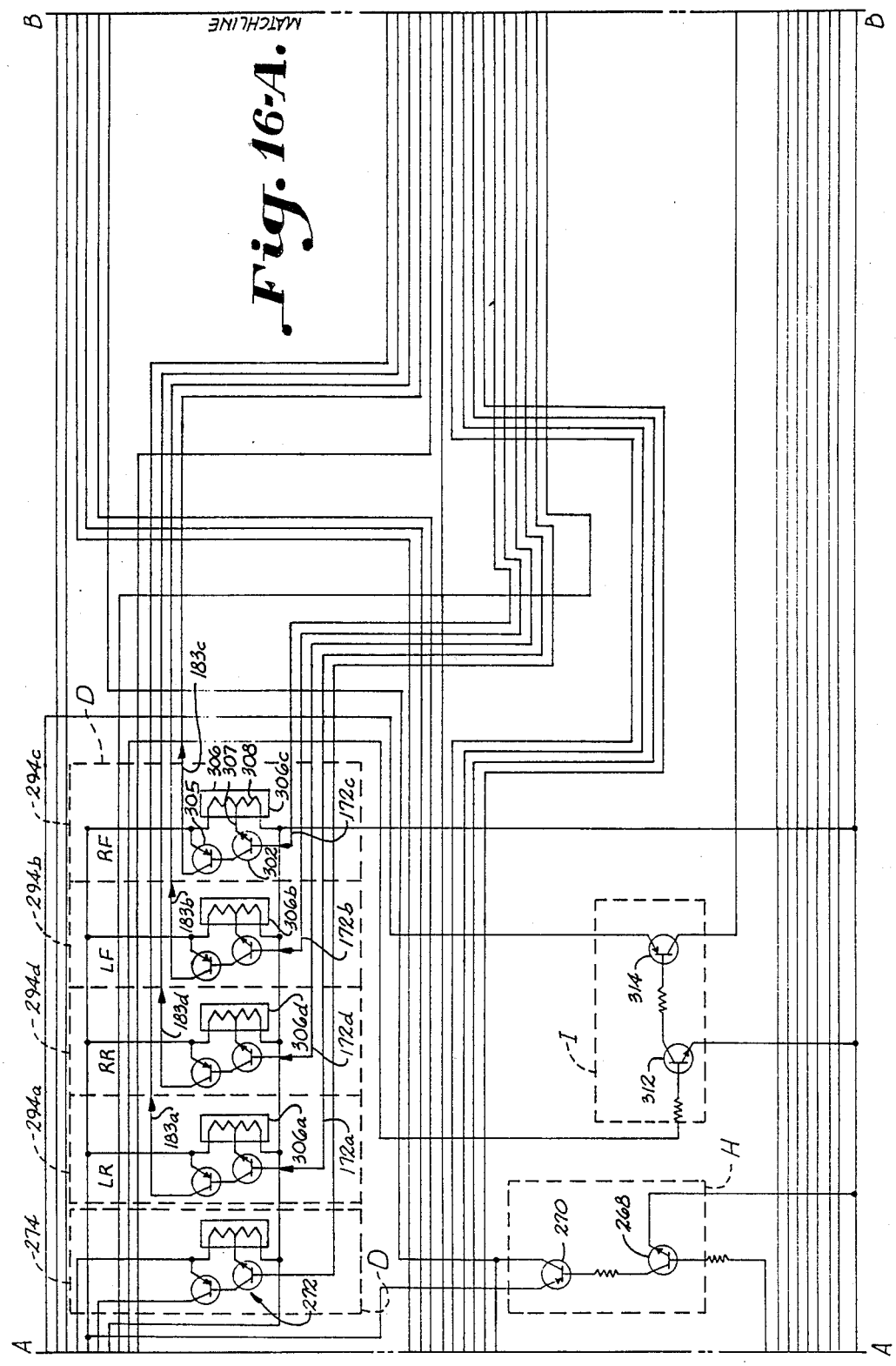
Fig. 16-A.

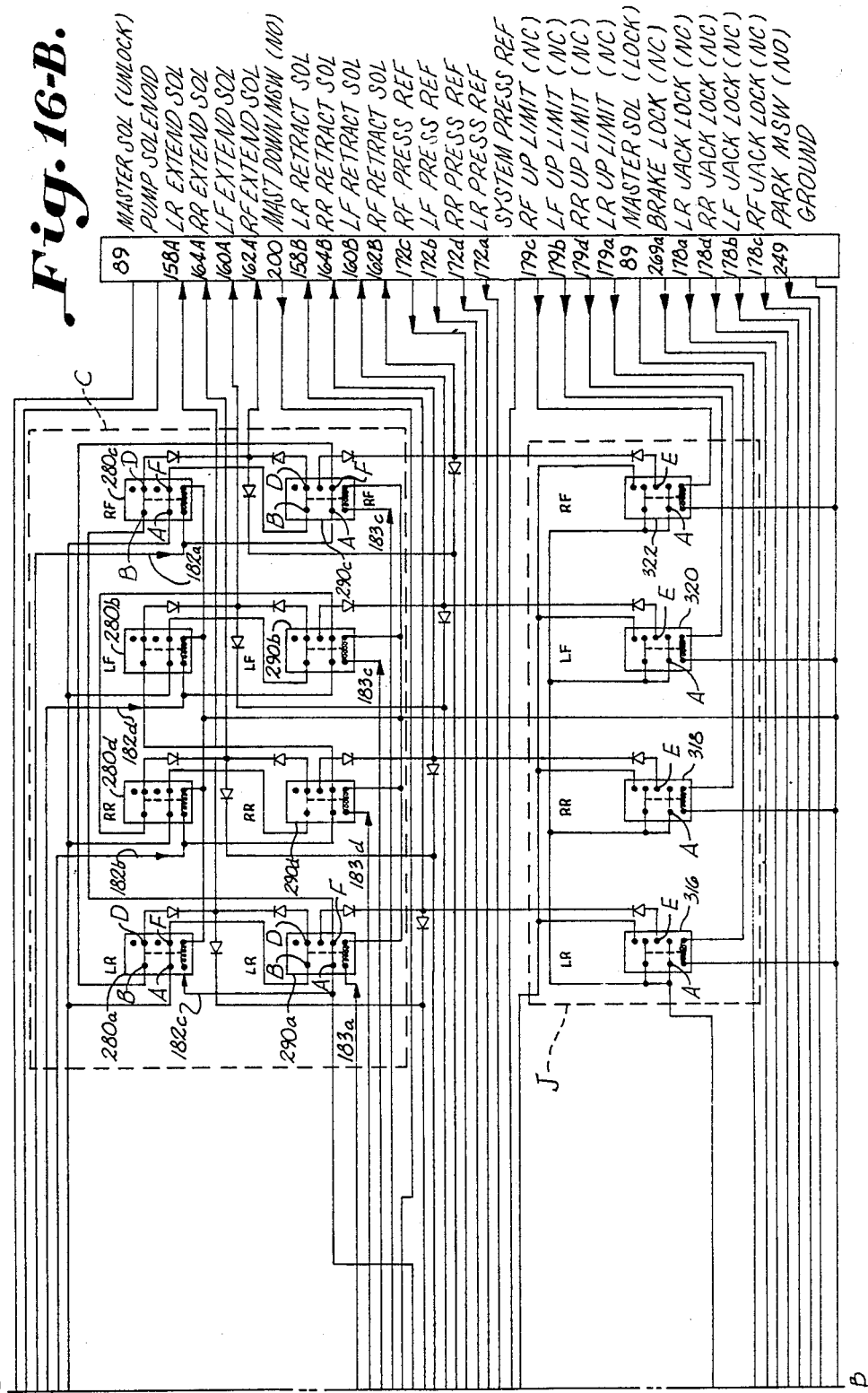
Fig. 16-B.

SURVEILLANCE VEHICLE CONTROL SYSTEM

BACKGROUND OF THE INVENTION

This a continuation-in-part of U.S. Pat. No. application Ser. No. 855,834, now U.S. Pat. No. 4,815,757 filed on Apr. 24, 1986 entitled Rapid Deployment Surveillance Vehicle.

The invention relates to a control system for a surveillance vehicle having a surveillance device rapidly deployed from a concealed position within the interior of the vehicle for surveillance. In particular, the invention relates to detecting persons and vehicles engaged in illegal activities such as immigration, drug smuggling, subversive activities, and the like. Preferably, the surveillance device may be a heat sensing device such as an infrared camera for detecting objects at night or when camouflaged or hidden. The problem of illegal immigration and drug smuggling across national boarders has became particularly acute during recent years.

During the surveillance, it is desired to elevate the surveillance device to an altitude of about thirty feet. The vehicle must appear like an ordinary off-the-road vehicle when the surveillance device is not deployed. The surveillance device must be rapidly deployed in three seconds or less. The surveillance device must not be deployed and elevated to thirty feet unless certain conditions exist. These conditions include the vehicle drive systems being in a locked condition and the vehicle being in a level condition. Otherwise, mast extension to thirty feet could cause severe damage, particularly under adverse weather conditions, like high gusting winds. These conditions often exist in the rough terrain and the environment of desert conditions which form many national boundaries. Rapid deployment is necessary for rapid stop and go operation to cover as much area as possible. A vehicle having this capability presents many problems in controlling the various systems necessary for braking, leveling, retracting, extending, and deployment, particularly of the mechanical systems. A surveillance instrument must be deployed from a totally concealed condition inside a normally appearing off-the-road vehicle to a mast elevated position of thirty feet. A multitude of conditions and detections of these conditions must be carried out in each deployment step of the surveillance device. Once the surveillance device is deployed, continuous monitoring and detection of these conditions must be carried out for safety and stability for long range surveillance.

U.S. Pat. No. 4,593,474 is typical of systems deployable from van-like vehicles for surveying and television camera purposes. These systems only require limited extension above the vehicle roof and do not involve the type problems found in the present invention. The instrument is not raised to high elevations and it is not necessary to provide a mechanism to move the mast both horizontally and vertically. Stabilizing jacks may be used, but automatic leveling jacks are not used since leveling requirements are not strict. U.S. Pat. No. 4,597,584 discloses an automatic leveling system for a recreational vehicle in which hydraulic jacks at the four corners of the vehicle are extended to level the vehicle. However, there is no further or continuous monitoring of the level condition. Once the vehicle is leveled, there is no feed back to the leveling system, the system is locked by a hydraulic lock in the level condition reached initially. There is no accommodating of changing level conditions and no provision for detecting any off-level condition and restoring the vehicle to level. Other constructions and arrangements of only general interest are shown in U.S. Pat. Nos. 4,512,589; 2,719,471; 1,276,825; 2,854,252; 3,523,698; British Pat. Nos. 124,268; 478,803; French Pat. No. 1,546,575; German Pat. No. DT 3,317,003; and patents cited in the above referenced parent application.

Control systems for leveling a vehicle having a hoist and the like are shown in U.S. Pat. Nos. 3,738,502, 4,632,261, which are of general interest only. U.S. Pat. No. 4,445,588 discloses a control system for a leveling system of general interest.

Accordingly, an object of the present invention is to provide a control system having interactive components for erecting a mast from a horizontal position through the roof of a vehicle to an elevated position while simultaneously locking the brake system, unlocking the leveling system, and leveling the vehicle while monitoring environmental conditions such as ground pressure, and high voltage which may be detrimental to the surveillance.

Another object of the invention is to provide a control system for a surveillance vehicle having a number of interactive mechanical systems which controls the interaction of the mechanical systems for rapid deployment of a surveillance device while monitoring and maintaining all systems within prescribed conditions on a stop and go basis.

Another object of the invention is to provide a simple and reliable control system for a surveillance vehicle from which a surveillance device may be deployed from a completely concealed condition inside the interior of a four-wheel drive vehicle to a mast elevated position with heights of up to thirty feet in about three seconds while maintaining the vehicle in a safe and level condition.

Still another object of the invention is to provide a control system for a surveillance vehicle having a plurality of interacting mechanical systems, and sensors and detectors for monitoring limits and conditions of the mechanical systems while deploying the surveillance device from a completely concealed condition within a four-wheel drive vehicle to an elevated position thirty feet above the vehicle in about three seconds or less.

SUMMARY OF THE INVENTION

A control system is disclosed for a rapid deployment surveillance vehicle having a vehicle cab with a roof door through which an instrument for surveillance and the like may be deployed. The control system deploys the instrument from a concealed stowed position within the vehicle cab to an elevated position extended through a door opening of the roof door high above the vehicle. The vehicle has a telescoping mast having a telescoped retracted position and a telescoped extended position. A ram moves the retracted mast between a generally horizontal stowed position and vertical erect position. A mast operator moves the mast between the telescoped retracted and extended positions. A leveling system with a jack generally adjacent each corner along an X-axis of the vehicle has a retracted position in which the jack may be locked and unlocked. The jack has an extended position in which an unlocked retracted jack is extended against the ground. The control system comprises a ram switch for electrically actuating the ram having a ram up switch signal and a ram down switch signal. A mast switch actuates the mast operator having a mast extend switch signal and a mast retract switch signal.

A ram detector electrically detects a ram down condition of the ram in which the mast and instrument are in the stowed position and generates a ram down condition signal. The ram detector detects a ram up condition in which the mast and instrument are in the erect position and generates a ram up condition signal. A door detector electrically detects a door open condition of the roof door in which the roof door and the door opening are open and generates a door open signal. A ram control is provided for electrically controlling the ram to move the mast and instrument from the stowed position to the erect position in response to the ram up switch signal and the door open signal. A level sensor senses the level condition of the vehicle near the jacks for generating an electrical level condition signal representing the levelness of the diagonally opposed corners of the vehicle. The mast control controls the mast operator to extend the mast from the telescoped retracted position to the telescoped extended position in response to the mast extend switch signal and the ram up condition signal. A jack leveling logic circuit receives the level condition signals and electrically controls the jack drive means to interactively extend and retract the jacks to maintain the vehicle in a prescribed level condition with the mast extended and instrument elevated during surveillance operations. Jack pressure sensors are carried adjacent the jacks for sensing the pressure of the jacks against the ground and generating electrical jack pressure signals. A pressure control circuit receives the jack pressure signals for electrically controlling the jack drive means to extend and retract the jacks in order to maintain a prescribed pressure on the jacks against the ground. According to the control system and method of the invention, the logic circuit processes the off-level signals and the jack pressure signals to extend a low corner jack and retract a diagonally opposed high corner jack if the jack pressure of the high corner jack is equal to or greater than a system preset pressure, and an off-level signal exists at the low corner jack. If the high corner jack pressure is less than the preset pressure, the logic circuit extends the low corner jack while the high corner jack drive is disabled. The low corner jack is extended until the off-level signal is terminated, or the high corner jack pressure becomes equal to the preset pressure. The high corner jack is extended until system preset pressure is reached if low corner jack extension is terminated in response to termination of the off-level signal before preset pressure is reached on the high corner jack.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 9 is a partial cut-away elevation of an extended corner jack of a leveling control system for a vehicle according to the invention at a left rear corner;

FIG. 10 is an elevational view illustrating the corner jack of FIG. 9 in a locked retracted configuration in accordance with the invention;

FIG. 11 is a schematic view illustrating a leveling system for a surveillance vehicle control system having corner jacks arranged diagonally along a vehicle X-axis for providing levelness according to the invention;

FIG. 16A is a circuit diagram of a rapid surveillance vehicle control system according to the invention illustrating a second part of a leveling control system;

FIG. 16B is a circuit diagram of a rapid surveillance vehicle control system illustrating a third part of a leveling control system;

DESCRIPTION OF A PREFERRED EMBODIMENT

Figure 1:
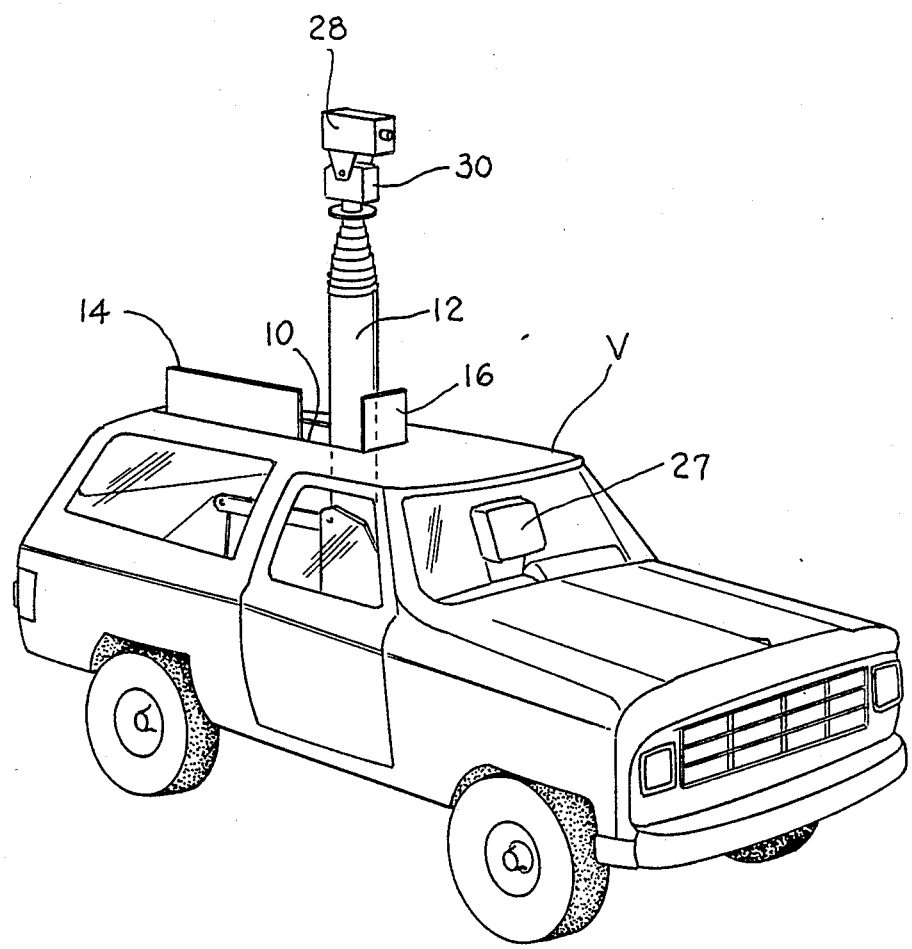
FIG. 1 is a perspective view illustrating an off-the-road vehicle incorporating a control system for a rapid deployment surveillance vehicle in accordance with the present invention.

Referring now in more detail to the drawings, FIG. 1 illustrates a conventional four-wheel-drive vehicle commonly referred to as an off-the-road vehicle incorporating a rapid deployment surveillance system for detecting any activity in accordance with the present invention. A cab 10 has an interior space 10a in which the driver, operating controls, and retracted surveillance system are housed. The vehicle designated V has an opening 11 formed in the roof through which a telescoping mast 12 extends. There is a side pivoting main door 14 and a top displacement door 16 which closes the opening 11.

Figure 2:
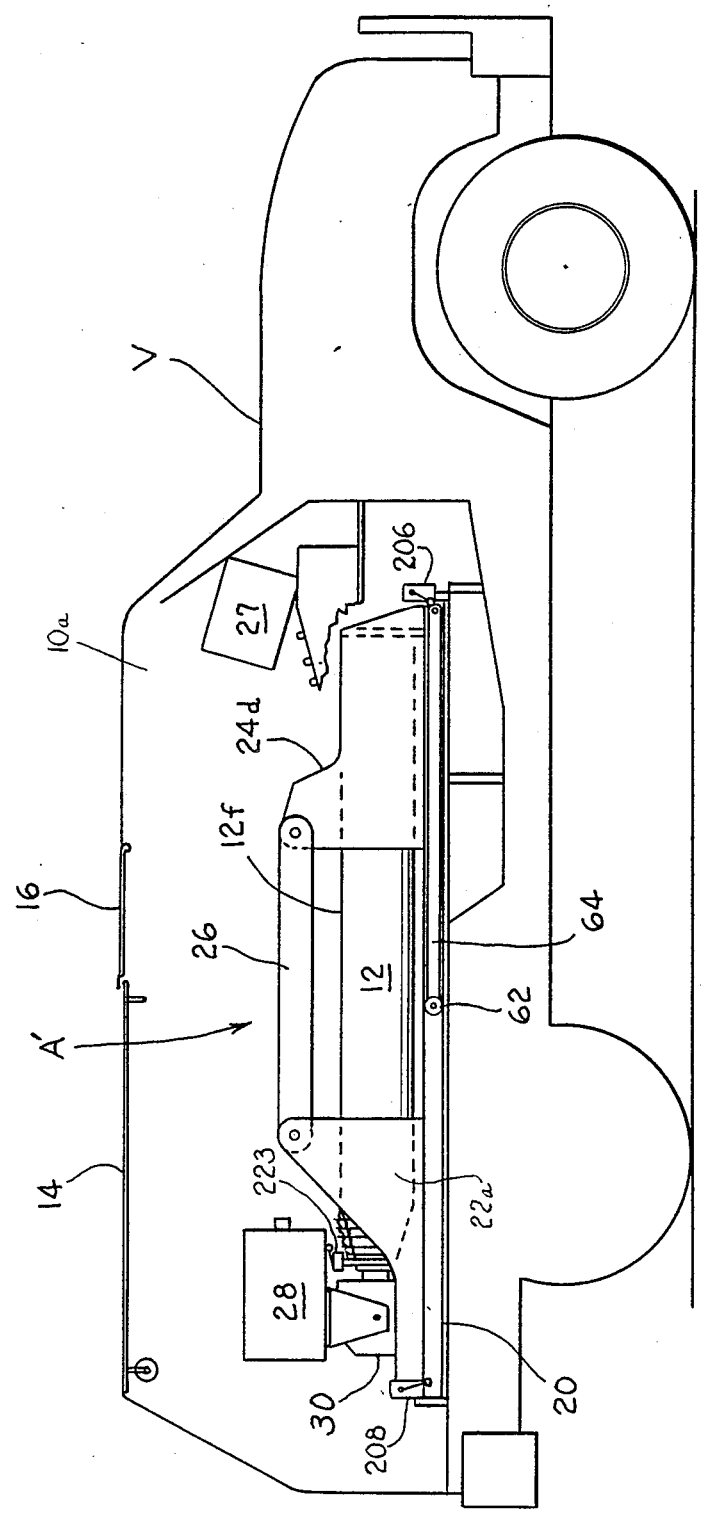
FIG. 2 is a side cut-away view of a vehicle with a control system for a rapid deployment surveillance system according to the invention in a stowed concealed configuration.
Figure 3:
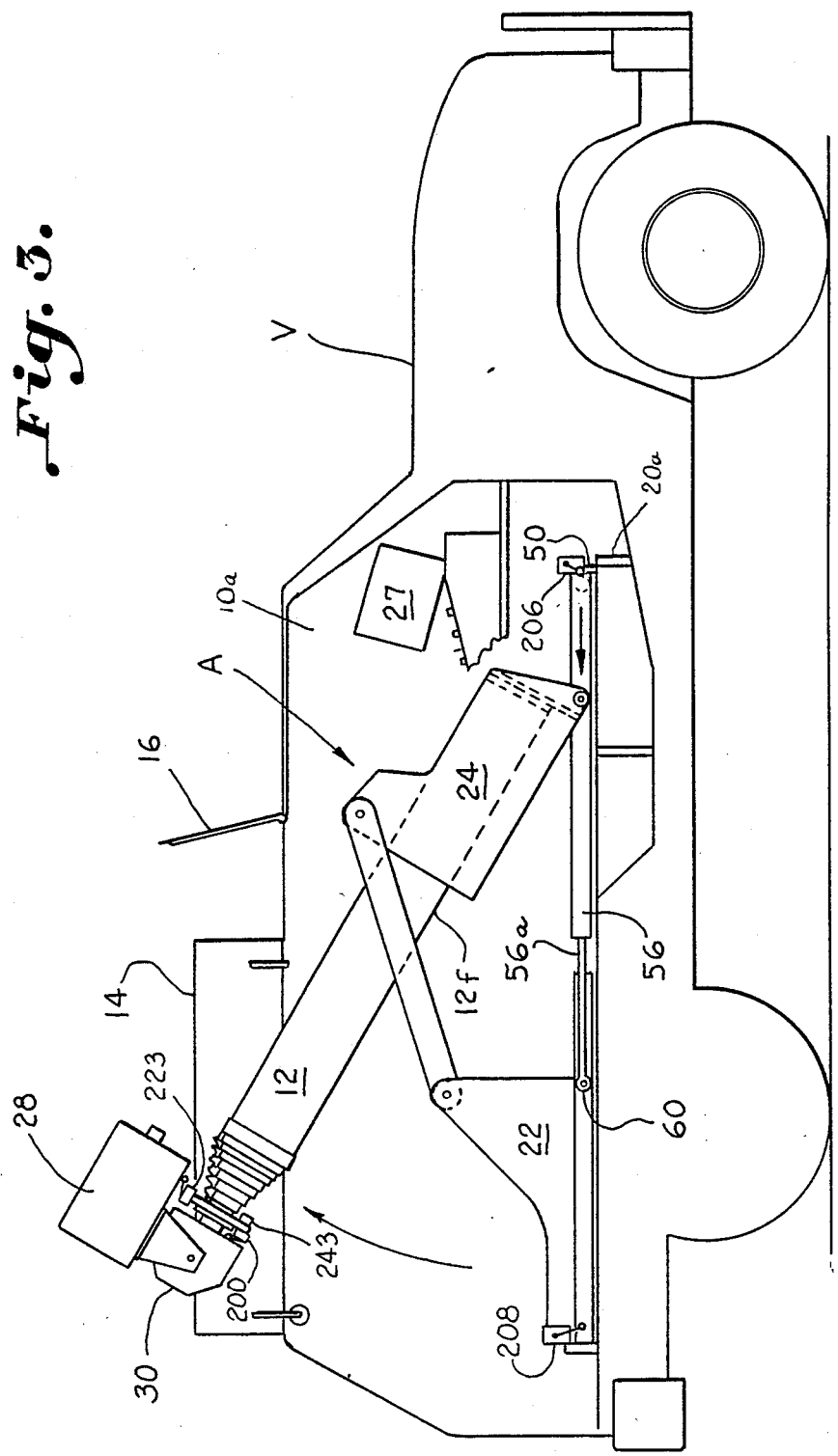
FIG. 3 is a side elevation of a vehicle with parts cut away illustrating the rapid deployment surveillance system in a partially erected configuration.

Referring to FIG. 2, the surveillance system is illustrated in a stowed configuration in which it is concealed and secured from theft or damage. In this configuration the vehicle V takes on the appearance of conventional off-the-road vehicle. The vehicle may be driven in a normal manner to a sight where surveillance is desired without advance warning to those under surveillance. The surveillance system is provided with a compact, highly advantageous, rapid deployment and retraction assembly designated generally as A'. The assembly A' includes a track mechanism 20 upon which a support mechanism 22 is affixed. There is a carriage mechanism 24 which slides and rotates relative to track mechanism 20. There is a support arm 26 pivotally connected between support mechanism 22 and carriage mechanism 24. Mast 12 is carried by carriage mechanism 24 from the horizontal stowed position to the vertical erect position as can best be seen in FIG. 3. Mast 12 includes base sections 12f affixed to carriage mechanism 24 at a base 24a and side plate 24b such as by welding.

The telescoping mast 12 is shown in a stowed, nested configuration with an instrument 28 affixed to its end. Instrument 28 may be any desired instrument like a conventional infrared camera, low-light camera, standard television camera, listening device, laser rangefinder, etc., as well as a combination of these devices.

Preferably, instrument 28 is an infrared camera. A suitable camera is manufactured by Texas Instruments Company of Dallas, Texas as model AN-TAS-A6A. The infrared camera 28 is pivotally attached at 28a a pan/tilt device 30. Pan/tilt device 30 may be any conventional device for tilting camera 28 as well as rotating camera 28 three hundred and sixty degrees about the longitudinal axis of mast 12. A suitable pan/tilt device is manufactured by Quikset Company of Illinois. Preferably, the pan/tilt device is a proportional motor control such as disclosed in applicant's copending application entitled "Proportional Motor Control Circuit" U.S. Ser. No. 855,834, now U.S. Pat. No. 4,815,757. The pan/tilt device 30 is affixed to the end of the last leg 12a of the mast 12 in any suitable manner such as by welding a platform 30a onto a pin received in leg 12a. The mast 12 may be any suitable telescoping mast which is pneumatically operated. One suitable mast is manufactured by Will-Burt Manufacturing of Orrville, Ohio as Model TDM-642. The mast includes six telescoping legs and will extend to a height of thirty feet. In the stowed, retracted configuration, the mast has a height of approximately six feet. It is necessary to provide a highly compact erection/retraction of the six-foot mast from the stowed position (FIG. 2) to the erect position (FIG. 3) since the height of the interior space within vehicle cab 10 is considerably less.

Figure 4:
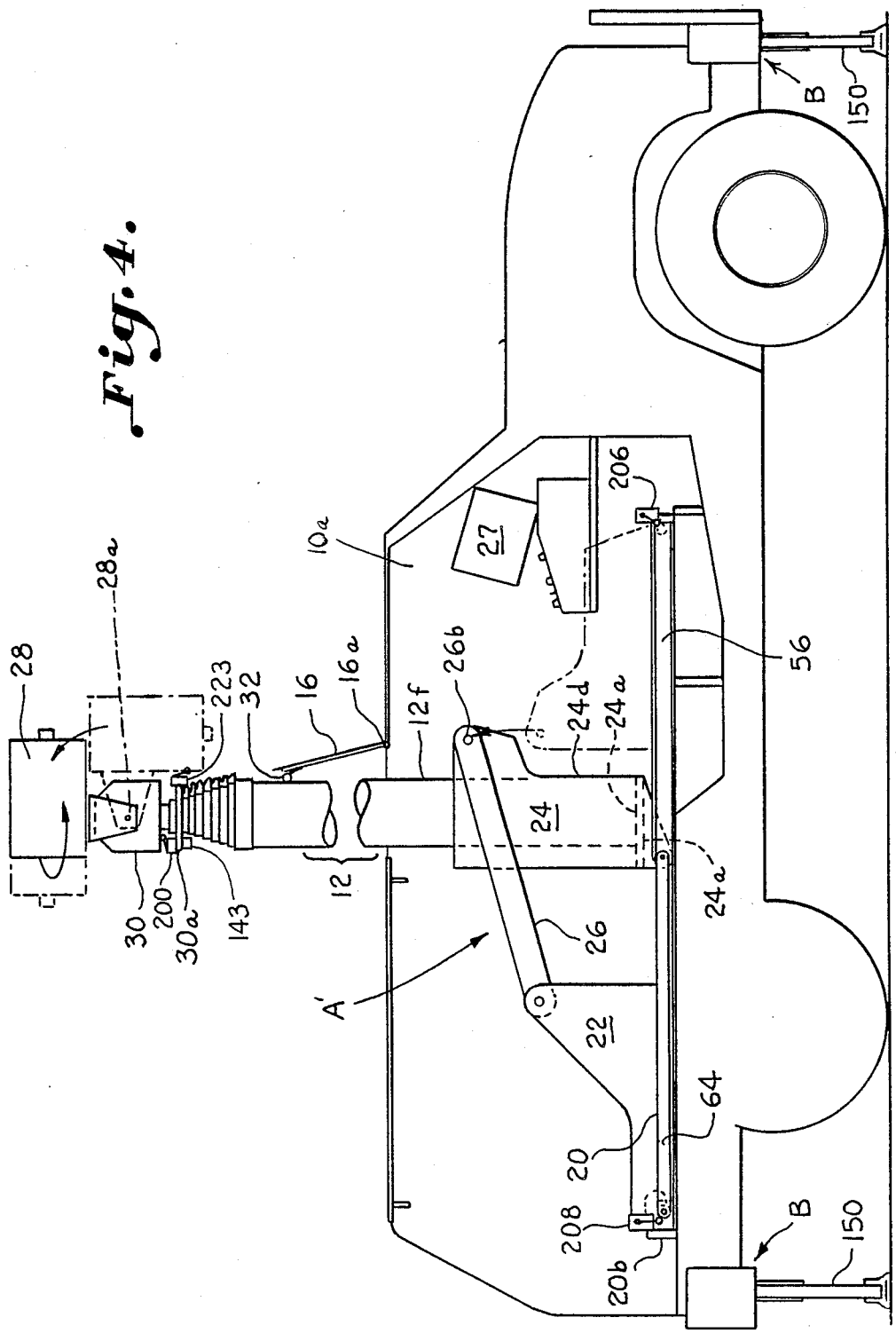
FIG. 4 is a side cut-away elevation of a vehicle employing a control system for a rapid deployment surveillance system with a detection device in an erect configuration.

The movement of the rapid erection assembly A' is actuated by ram air cylinders which will be described in more detail hereinafter. Prior to beginning of the erection movement of the surveillance system, main door 14 may be automatically opened by air actuation in a manner to be more fully hereinafter described. With main door 14 open, mast 12 begins its travel to a fully erect position, as can best be seen in FIG. 4, manually opening displacement door 16. After reaching this fully erect position, main door 14 will close to seal the interior of the vehicle cab against the outside elements. Displacement door 16 is hinged at 16a and there is a roller at 32 which is engaged by mast 12 to pivot displacement door 16 to the open position as seen in FIG. 4. Displacement door 16 may be spring loaded so that it automatically closes when the mast retracts. It can be seen that carriage plate 24 is pivoted and rotated to an upright position ninety degrees from that as shown in the stowed position of FIG. 2. Likewise, support arm 26 has pivoted about 26a and 26b to allow the movement of carriage plate 24. Carriage plate 24 has moved from the front end 20a of track mechanism 20 to an approximate mid-point thereof.

Mast 12 is affixed to a base plate 24a affixed to the carriage assembly 24 and is likewise affixed to a plate 24b carried between opposing sides of carriage 24. In this manner, mast 12 is affixed to carriage mechanism 24 and moves therewith from the stowed position in FIG. 2 to the erected position in FIG. 4.

Figure 5:
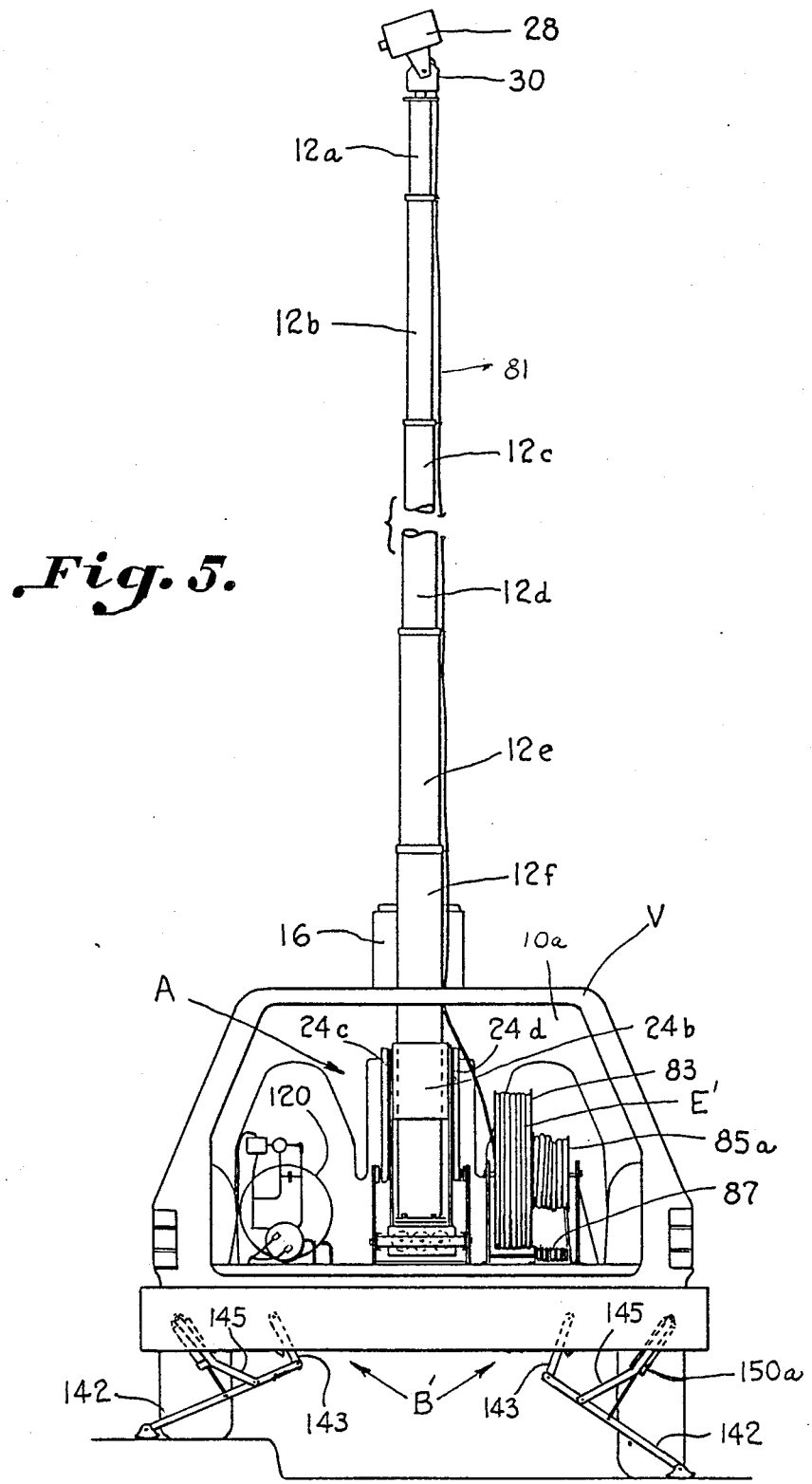
FIG. 5 is an end view of an off-the-road vehicle employing a control system for a rapid deployment surveillance system in a fully erect and extended configuration.

FIG. 5 illustrates mast 12 in its fully extended position extended through displacement door 16 to approximately thirty feet. As can be seen, mast 12 comprises legs (12a through 12f). Infrared camera 28 is pivoted for three hundred sixty degree rotational movements, and also for one hundred and eighty degrees of vertical movement about a pitch axis for adjusting the elevation of the camera. This enables the range of the camera to be adjusted and extended, and also allows the camera to view over obstacles. The maximum range would be, of course, in the horizontal position, and the range of the camera would decrease as it is tilted downward.

There is also shown in FIG. 5 part of a leveling system having jack assemblies, designated generally as B', for leveling the vehicle V. In this manner, a stable platform 30a is provided for the detection device 28 and pan/tilt device 30. This is particularly true in regards to stabilizing against wind and wind gusts. As long as the mast is vertical within a described range of degrees, the camera 28 will survey the area without vibrations or other transitory disturbances as would effect the image transmitted and displayed on monitor 27. For optimum optics, the mast should be kept within about two degrees of true vertical.

Figure 6:
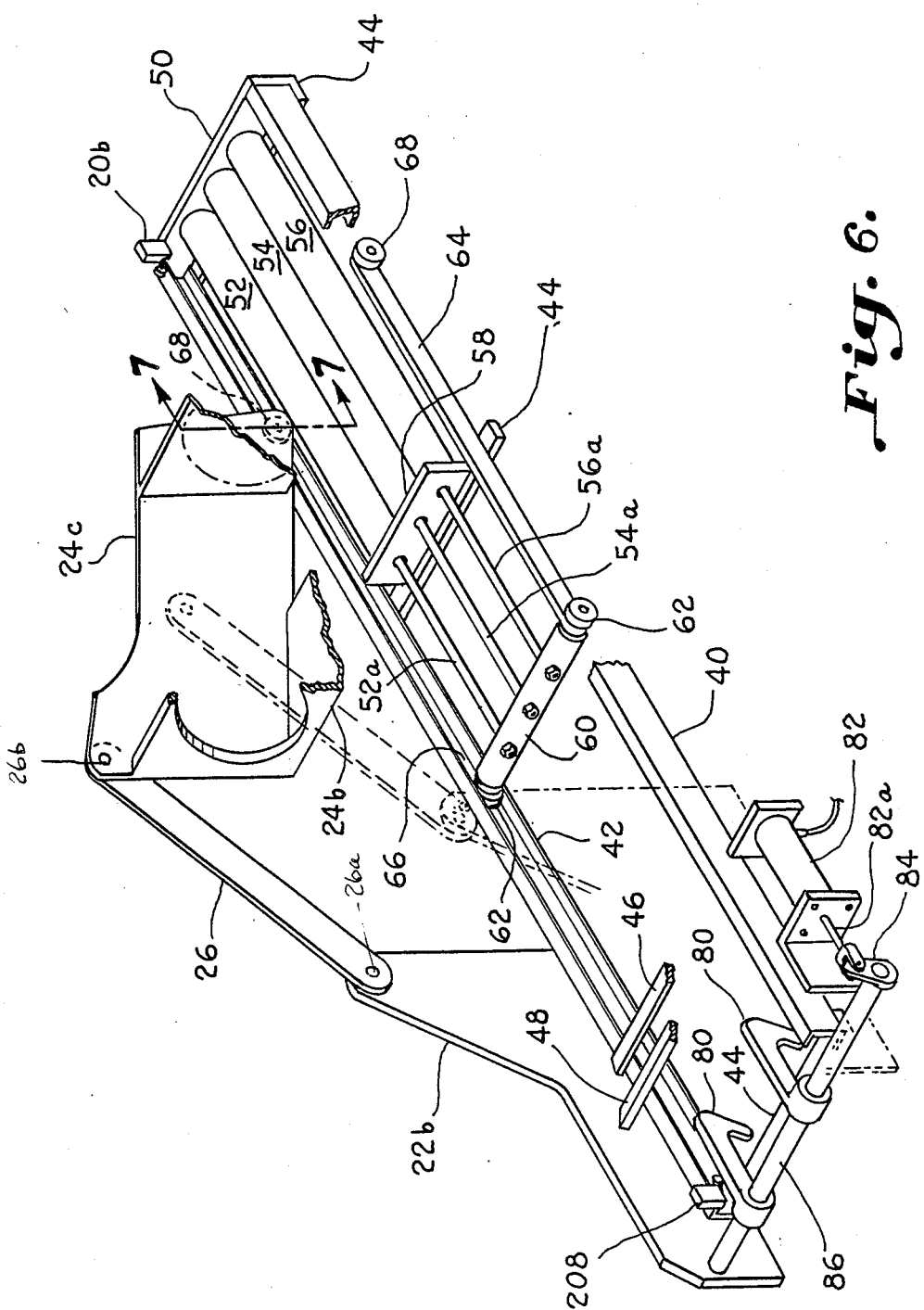
FIG. 6 is a perspective view with parts broken away of a rapid erection/retraction assembly constructed according to the invention.

Referring now to FIG. 6, the details of the rapid erection assembly A' will now be described. There are a pair of U-shaped channel tracks 40 and 42 which are spaced apart by means of plates 44 affixed to the bottom of the vehicle floor and to the channels by any suitable means, such as welding. A support mechanism 22 comprises two parallel side plates 22a and 22b affixed to the outside of channels 40 and 42 respectively by any suitable means such as welding. Support mechanism 22 includes a pair of transverse support bars 46 and 48. Support bar 46 extends horizontal between channels 40 and 42 and support bar 48 is inclined at approximately forty-five degrees. The support bars 46 and 48 provide a cradle to support the pan/tilt device 30 when in a stowed configuration.

There is a front plate 50 affixed between track channels 40 and 42. Ram drive means is provided by three air cylinders 52,54,56 having one end affixed to a cylinder block 58 affixed between the track channels 40 and 42 by any suitable means. Respective piston rods 52a, 54a, 56a extend through the cylinder bloc 58 and are connected to a transverse cylindrical lockbar 60. There are a pair of rear roller bearings 62 affixed to ends of the lockbar 60. The roller bearings 62 include shafts affixed to lockbar 60 and there are a pair of parallel drawbars 64 and 66 also affixed to the shafts of the roller bearings defining a draw frame means. There are a pair of front roller bearings 68 which are affixed to shafts which extend through the front of drawbars 64,66. Actuation of the ram air cylinders causes the frame means, defined by the lockbar 60, drawbars 64,66, and carriage mechanism 24, to slide longitudinally along the track mechanism 20 defined by the channels 40 and 42. Carriage mechanism 24 includes a pair of side plates 24c and 24d which are affixed to the front roller bearings 68. Plate 24b extends between the carriage side plates 24c and 24d. The bottom mast support plate 24a extends between the sides.

A ram lock for locking the lockbar 60 when mast 12 is fully erect is shown in FIG. 6. The lockbar 60, together with drawbars 64,66 and carriage mechanism 24, slides to the rear of track mechanism 20 when mast 12 is fully erect. In this position, lockbar 60 will abut a pair of locking hooks 80 which will be pushed up allowing their hook portion to latch over the lockbar 60. This ensures that the mast will stay fully erect. When it is desired to retract the mast, an air cylinder 82 will be actuated which will rotate lock members 80 counterclockwise to release the lockbar 60. For this purpose, piston rod 82a is connected to a crank arm 84 affixed to rod 86 to which the lock members 80 are affixed. The piston rod will push lever 84 to rotate the lock members 80 counterclockwise releasing lockbar 60. There is a microswitch 208 which is actuated when engaged by lockbar 60 in the locked position. Similarly, there is a front microswitch 206 actuated in response to carriage mechanism 24 arriving at the front of a track mechanism 20 when the mast is stowed, as can best be seen in FIGS. 2 and 4.

As can best be seen in FIG. 5, a cable retraction mechanism is illustrated facilitating extension and retraction of an electrical transmission cable 81 which is routed along mast 12 and connects camera 28 and monitor 27. There is a cable reel 83 rotatable mounted to the vehicle floor. The cable is wound on reel 83 and has a flow auxiliary windings are formed upon an auxiliary reel which act like a clock spring during extension and retraction of cable E'. From the auxiliary windings, a remote end of the cable is routed to monitor 27. There is a tension means for retracting reels 83 and 85 in the form of an elastic cord 87 wound upon a pulley block.

Figure 7:
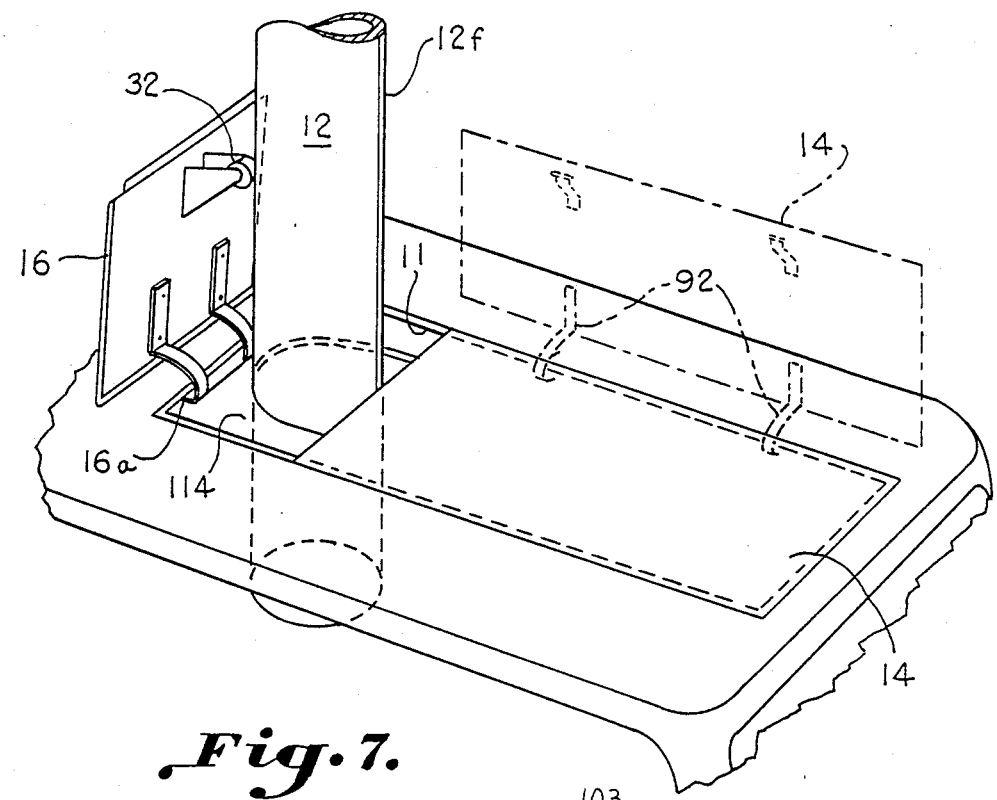
FIG. 7 is a perspective view of a vehicle cab roof door for a rapid erection/retraction assembly according to the invention.
Figure 8:
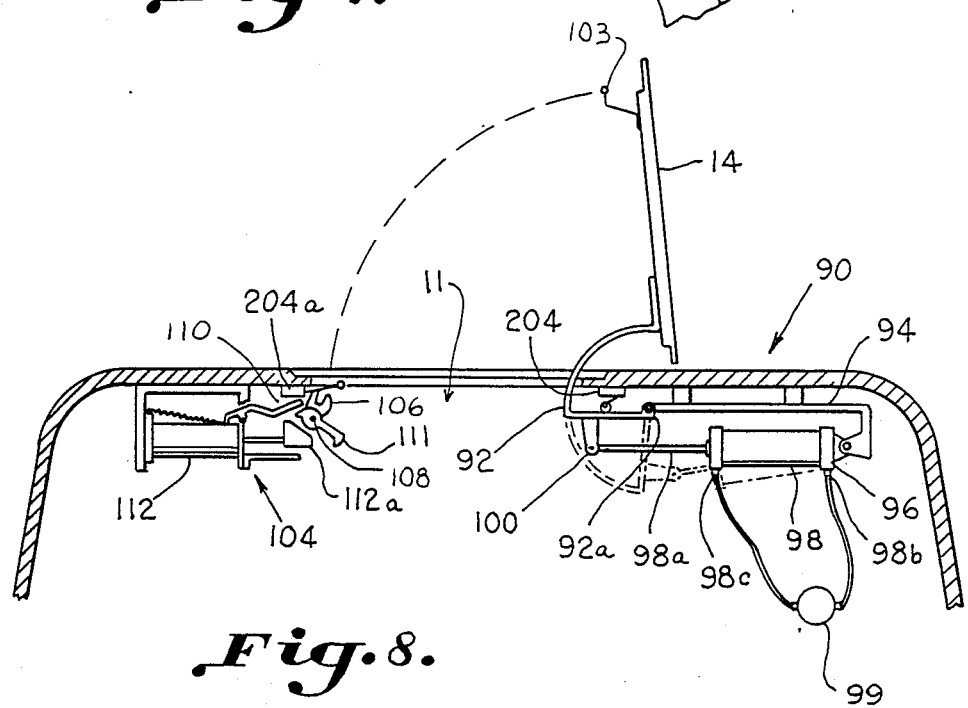
FIG. 8 is a sectional view taken through the vehicle cab and roof door of FIG. 7.

As can be seen in FIGS. 7 and 8, there is a door opening mechanism designated generally as 90 for opening the main door. Door opening assembly 90 includes a pair of offcenter hinges 92 which are pivoted at 92a to a frame 94 affixed to the inside roof of the vehicle. There is a bracket 96 at the rear of frame 94 which affixes a door operating air cylinder 98. The piston rod 98a is affixed to a pivot 100 which is carried by each hinge 92. Air cylinder 98 is a double action cylinder having a first port 98b and a second port 98c controlled by a solenoid valve 99. Admission and ventilation of air through the ports is controlled by valve 99. Admission of air to port 98b actuates piston rod 98a to the left in FIG. 10 which will pivot the hinge 92 upwards and open door 14. Admission of air to port 98c actuate piston rod 98a to the right and return the door to a closed position as air is vented through port 98b.

There is a door latching mechanism designated generally at 104 for locking the main door for security and weatherproofing of the door closure. Latching mechanism 104 includes a pair of spaced locking cams 106 affixed to a rod 108. There is a sear 110 which locks a cam 111 to prevent opening of the door. There is an air cylinder 112 having a piston rod cam 112a which lifts sear 110 up so that the door may be opened. Simultaneously, the piston rod cam pushes cam lock 111 counterclockwise to rotate the locking cams 106 upwards so that the air cylinders 98 of the opening assembly may raise the door up. A door condition detector means includes a door open microswitch 204 actuated to signal that the door is open and a door closed microswitch 204a actuated to signal the door is closed. Main door 14 is closed when mast 12 is extended by actuation of air cylinder piston 98a to the right. Door rod 103 engages in cam locks 106 which are pivoted downwardly, whereupon sear 110 falls in behind cam 111 to positively lock the main door. Displacement door 16 is lifted manually by erection of mast 12 as roller 32 is engaged by the mast. There is a seal and mast guide 114 which seals the vehicle interior with displacement door 14 open.

Figure 14:
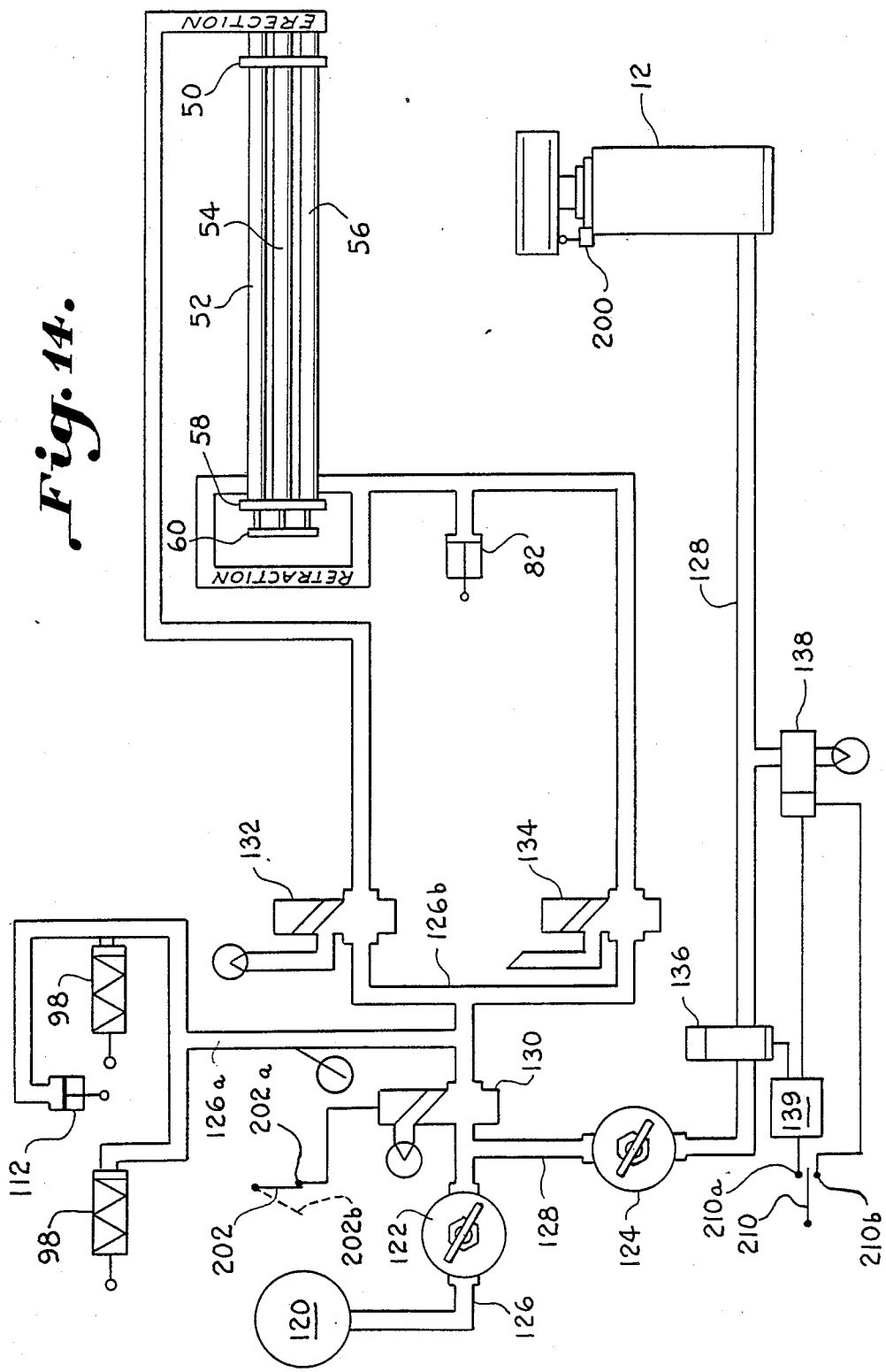
FIG. 14 is a pneumatic circuit diagram of a surveillance vehicle control for erecting and retracting a rapid deployment surveillance instrument in accordance with the present invention and for extending a telescoping mast with instrument attached.

Referring now to FIG. 14, an illustrative pneumatic circuit for operating the rapid erection/retraction assembly A' will now be described. There is a source of compressed air 120. There is a high pressure regulator 122 and a low pressure regulator 124 connected in lines 126 and 128. There is a first master air solenoid valve 130 connected in line 126. Line 126 branches into a line 126a and line 126b. Line 126a goes to door opening cylinders 98 and to door release cylinder 112 for opening main door 14. In branch line 126b, there is a second air solenoid 132 which opens to deliver air to cylinders 52 through 56 for erecting mast 12. There is a third air solenoid valve 134 which opens to allow air to actuate the air cylinder 82 for ram lock release of lockbar 60 and retraction of mast 12. Retraction is accomplished by admitting air to cylinders 52,56 only. In this manner, air cylinder 54 is vented and acts as an air brake so that the mast is retracted slowly. In operation, air solenoid valves 130,132,134 are normally closed. When the air solenoids are closed, the work side of the air lines are vented to ambient.

Ram up limit switch 208 detects the position of bar 60 in its rear position, and the mast erect and vertical. Ram down limit switch 206 detects the most forward movement of carriage 24 to the front position with the mast down and horizontal. When mast 12 is erect, rear limit 208 switch is actuated to signal closing of the air solenoids 130,132. Lockbar 60 is latched by the ram lock 80 to maintain mast 12 erect. When mast 12 is stowed, front limit switch 206 is hit to signal closure of solenoids 130,134. Air is allowed to be bled back through air solenoid 132 from air cylinder 54 to act as an air brake during retraction.

There is fourth air solenoid valve 136 which is normally closed. Air solenoid valve 136 is open to allow air to be admitted through line 128 to extend the mast 12 after erection. When mast 12 is retracted, there is a fifth air solenoid valve 138 which is open to allow the air to be dumped for retraction of the telescoping mast. Mast condition electrical microswitch 200 detects the retracted condition of mast 12 and signals closure of mast retraction solenoid 136 only after mast 12 is fully retracted.

As can best be seen in FIGS. 9, 10, and 11, a jack leveling system is illustrated for automatically maintaining the vehicle in a level configuration. This jack system is provided to maintain mast 12 within a prescribed level condition such as one degree of true vertical when fully extended, as can best be seen in FIG. 5. This provides for a stable platform for the infrared camera instrument 28. If mast 12 is more than five degrees off vertical, the telescoping legs may freeze and not properly telescope or retract. Further, it has been found that mast 12 when fully extended is susceptible to damage from high or gusty winds. If fully extended mast 12 is more than one degree off center, these wind conditions may cause shearing of the mast. If the platform for the detection device becomes unstable, then the image received on monitor 27 may become distorted sufficiently that the surveillance operation is ineffective.

Referring now in more detail to drawings, FIGS. 9 through 11, the jack system includes an identical jack, designated generally as B', mounted to the front and rear diagonal corners of vehicle V lying along an X-axis. For clarity, elements pertaining to the corners will be denoted "a" for the left rear, "b" for the left front, "c" for the right front, and "d" for the right rear, as seen in FIG. 11. Since each jack B' is essentially the same, only the jack at the left rear corner "a" of the vehicle will be described. As can best be seen in FIG. 9, there is a channel member 140 which is bolted to or otherwise affixed to the bumper supports of the vehicle. There is a jack leg 142 which has a pivoting foot which engages the ground. The remote end of jack leg 142 is pivotally attached at 141 to a link 143 pivotally attached to a bar 144 affixed to channel 140. A second pivotal link 145 is attached to jack leg 142 at 145a and bar 144 at 145b. A double action air cylinder 150 is attached to bar 144 and jack leg 142. There is an identical air cylinder 150 for jack B' at each corner. As can best be seen in FIG. 13, there is a cylinder 150a, 150b, 150c, and 150d at the left rear, left front, right front, and right rear jacks, respectively, for actuating jack leg 142a, 142b, 142c, and 142d. Air cylinder 150 includes a port 152 and a port 154 connected to a solenoid. For example, left rear cylinder 150a is connected to a solenoid valve 158 having an extension side 158A and a retraction side 158B. Extension side 158A is connected to air cylinder port 152 for extending jack leg 142. Retraction side 158B is connected to air cylinder port 154 for retracting jack leg 142. Air cylinders 150b, 150c, and 150d for leveling the other corners are identified, and there is a solenoid valve 160, 162, and 164 for controlling the respective air cylinders having an identical extension and retraction side A, B, as can best be seen in FIGS. 13 and 17. While only the left rear corner is illustrated in FIG. 11, it is to be understood that the remaining corners of the vehicle are provided with an identical jacking system. Air cylinders 150a, 150b, 150c, and 150d and solenoid valves 158, 160, 162 and 164 provide a means to drive jacks B' in extension and retraction.

Figure 16:
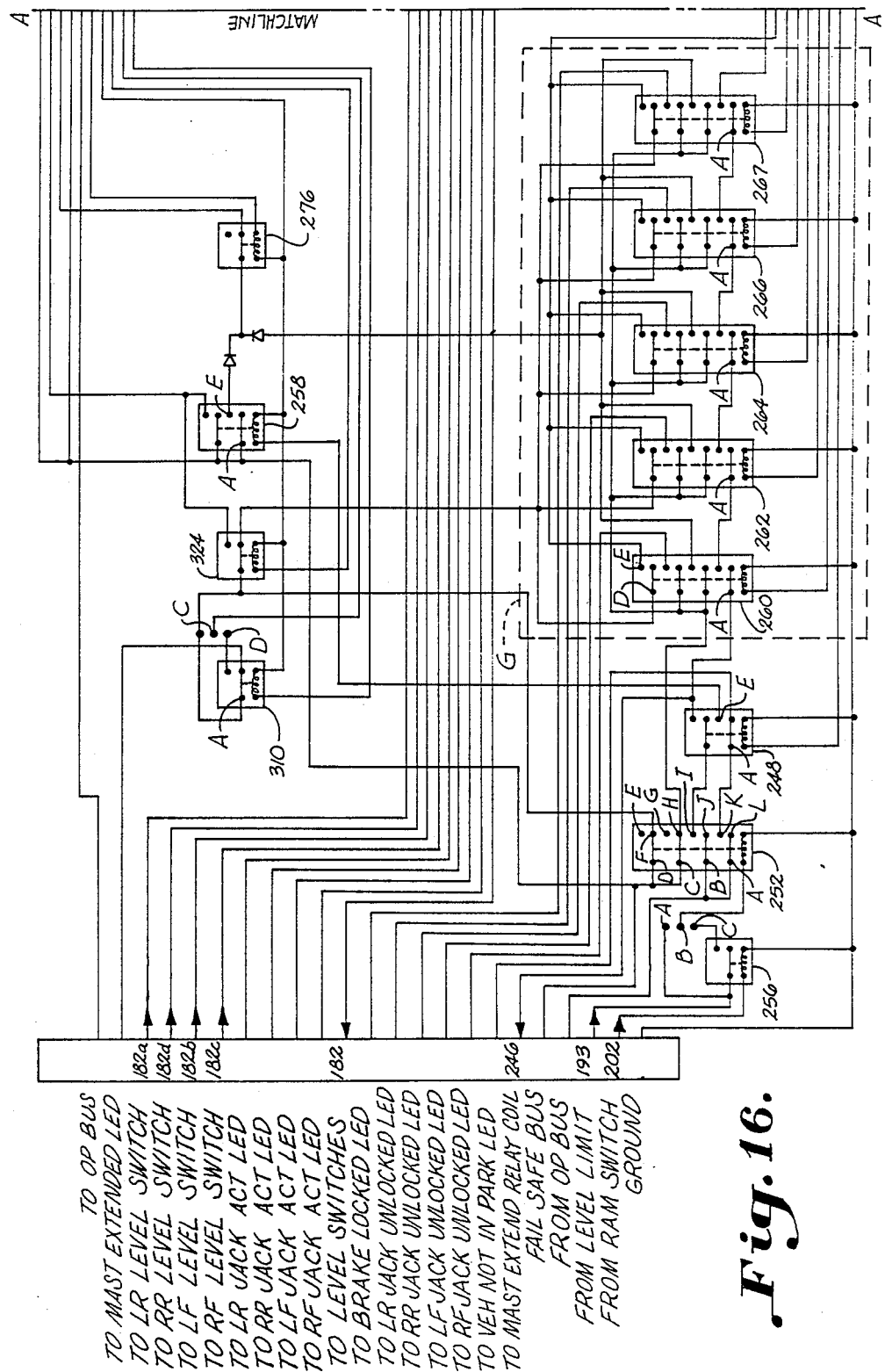
FIG. 16 is a circuit diagram of a rapid surveillance vehicle control system illustrating a first part of a leveling control system.
Figure 17:
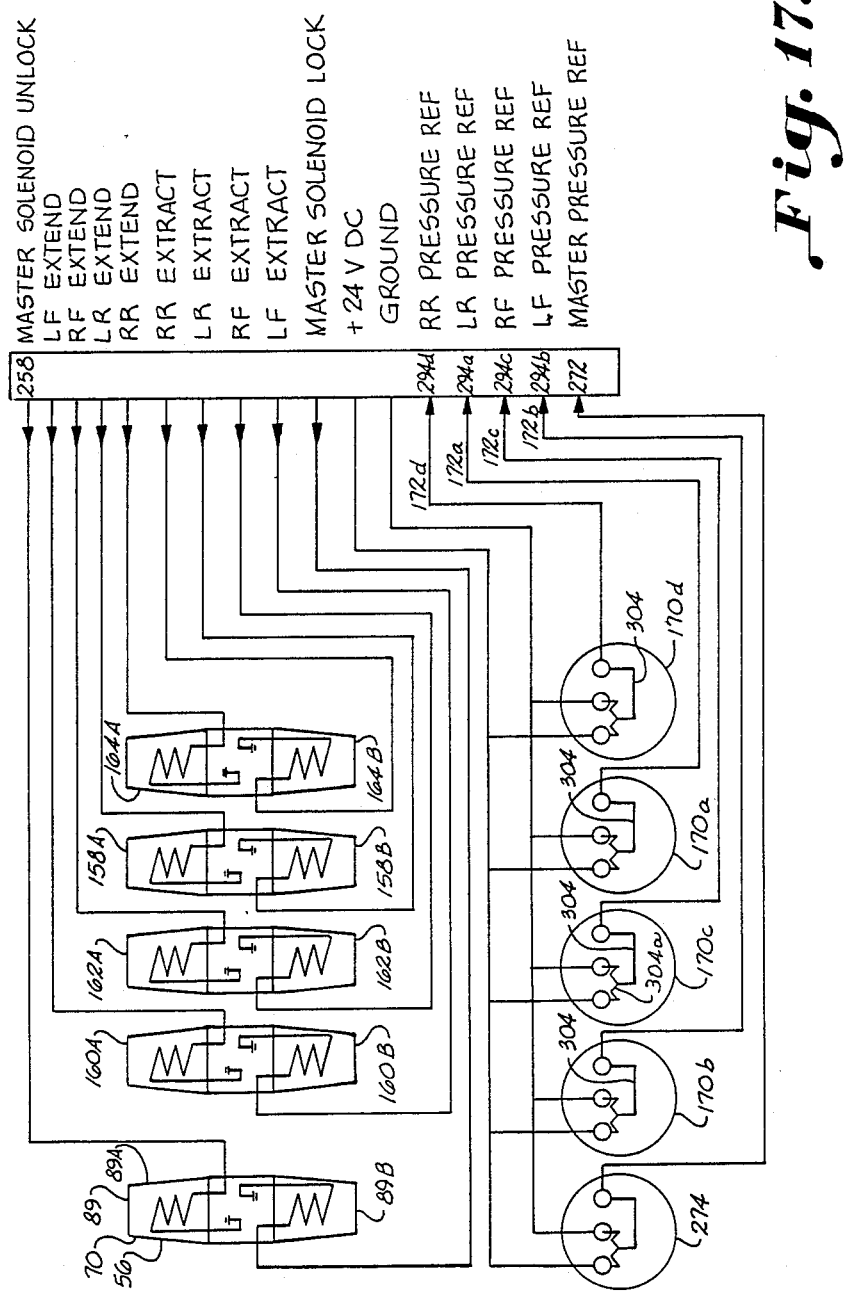
FIG. 17 is a schematic diagram illustrating a jack drive control system of a leveling control system for a rapid performance surveillance vehicle according to the invention.

As can best be seen in FIGS. 9 and 17, jack pressure sensor means for sensing the pressure of jack legs 142 against the ground includes a pressure transducer 170 located in the respective hydraulic lines of the cylinders 150 for sensing back pressure on each jack cylinder 150a–150d. Jack pressure signals 172 representing measured or actual jack pressure are produced by a transducer 170 at each corner. Actual pressure signals 172a, 172b, 172c, 172d are produced by the transducers at the left rear, left front, right front, and right rear wheel jacks, respectively. Reference pressure signals 174a–d are reset in a jack pressure control circuit D (FIG. 16A) by balanced potentiometers 306a–306d for each corner which are compared to measured jack pressure signals 172. Reference signals 174a, 174b, 174c, and 174d correspond to the four corners. Transducers 170 may be any suitable transducer such as a model 3000 made by the Bernitech Co. of New York, New York.

For each corner jack B', there is a jack lock 176 which latches a pivot pin 145a carried by leg 142 when the jack is in a fully retracted position, as can best be seen in FIG. 10. A small fluid cylinder 177 moves latch 176 between locked and unlocked positions. There is a jack unlock detector microswitch 178 which detects that latch 176 has been moved to the unlocked position of FIG. 9. Latch 176 is locked in response to detection of the jack in a fully retracted position which is detected by a jack up detector switch 179 at each jack.

Figure 13:
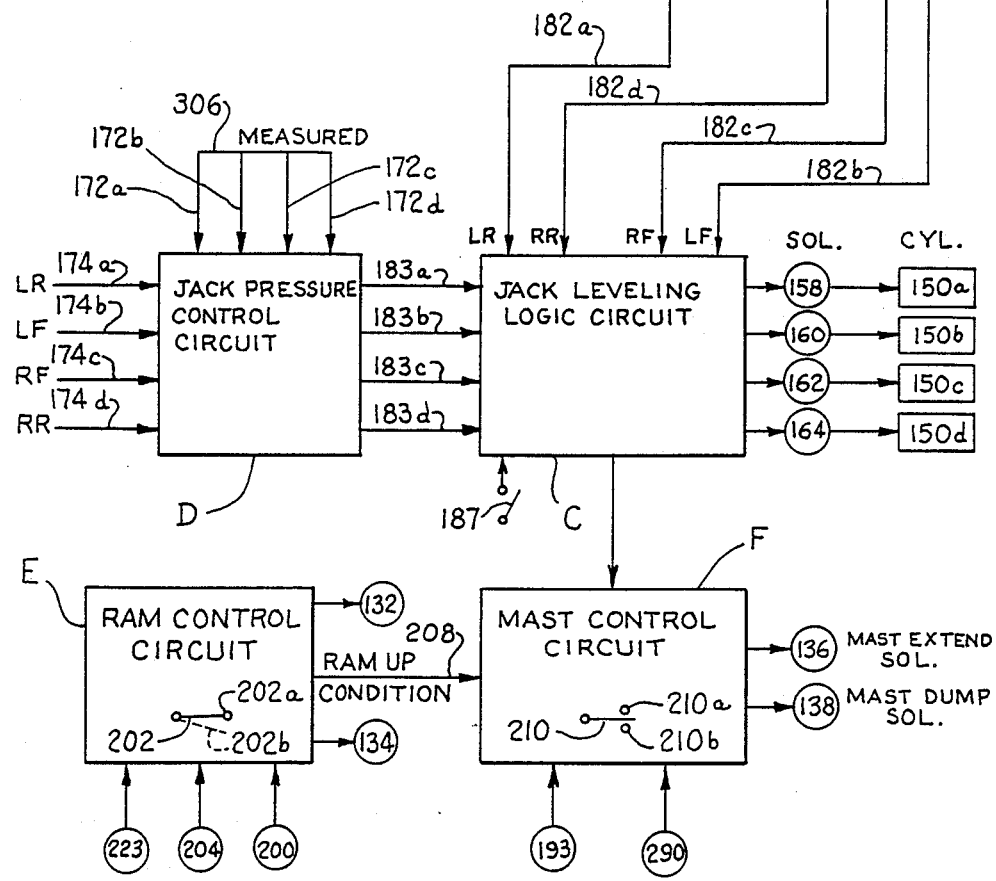
FIG. 13 is a schematic diagram of an automatic leveling system for surveillance vehicle control in accordance with the invention.

As can best be seen in FIG. 11, level sensor means for sensing a level condition of the vehicle includes mercury switches 181a, 181b, 181c and 181d arranged on diagonals 180a and 180b of an X-axis "X" which intersects the longitudinal axis "L" of the vehicle at forty-five degrees. The control system of the invention controls the leveling of each corner of the vehicle in response to receiving electrical signals from level sensing mercury switches 181a through 181d. From the level control signals, the jack air cylinders 150a through 150d are controlled to level the vehicle by a jack leveling logic circuit C (FIGS. 13 and 16B). Jack pressure control circuit D processes the actual jack pressure signals 172 and preset system reference pressure signals 174 to either not generate or generate jack pressure control signals 183a–d (FIGS. 13 and 16A). These pressure control signals, 183a, 183b, 183c, and 183d from all four jacks are also received and processed by leveling logic circuit C to control jack extension and retraction.

FIG. 13 is a simplified block diagram of a level control system illustrated schematically. Primary level sensor circuit 194 sends a level sensor signal 182a, 182b, 182c, 182d to jack leveling logic circuit C where the respective corner is low. Pressure control signals 183a, 183b, 183c, 183d of 1 are generated by pressure control circuit D when an actual pressure signal 172a through 172d at a jack is greater than or equal to the system reference pressure signal 174a through 174d at the corresponding jack. A generated pressure control signal is transmitted to leveling logic circuit C. Leveling logic circuit C processes signals 182a–182d and extends and retracts jacks 142 by controlling solenoid valves 158 through 164 which control air cylinders 150a through 150d for the four corners jacks to bring the vehicle into the desired level condition. Likewise, logic circuit C processes pressure signals from jack pressure control circuit D to maintain a prescribed pressure on the jacks through jack extension and retraction. This operation will be described later in more detail.

Figure 12:
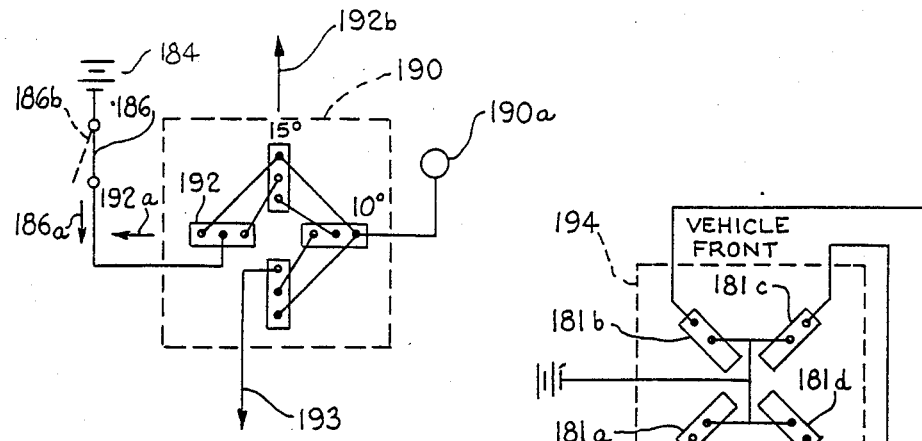
FIG. 12 is a schematic illustration of a vehicle level limits detector for a surveillance vehicle control system for leveling a vehicle according to the invention.
Figure 18:
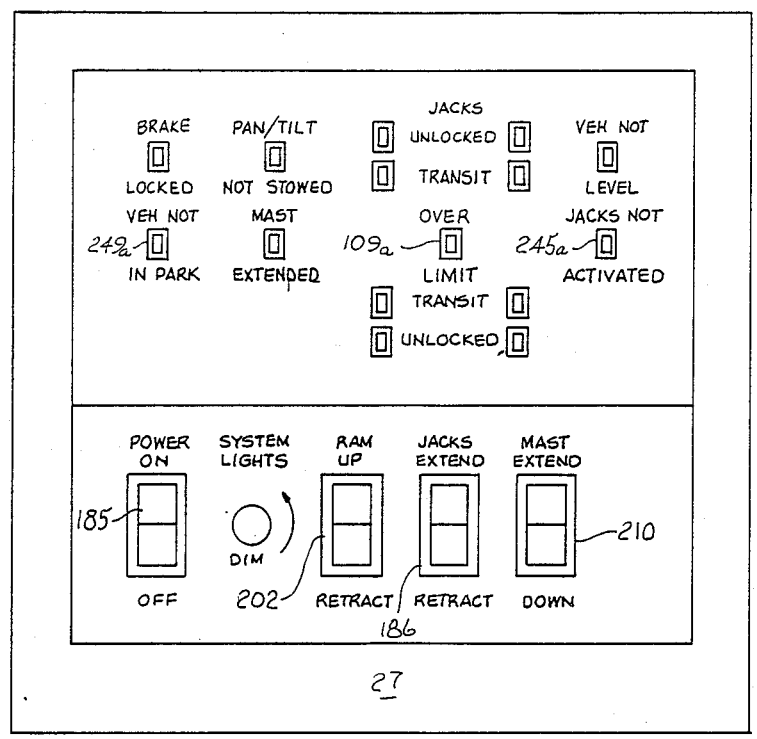
FIG. 18 is a plan view elevation of a control panel constructed according to the invention.

As can best be seen in FIGS. 12 and 18, on control panel 27, there is a control system master switch 185 connected to a power source, and a jack master switch 186. Jack master switch 186 is closed to generate a jack extend signal 186a and activate the jack leVeling system with control system master switch 185 on. Jack switch 186 has an open position 186b in which the absence of power indicates and provides a jack retract signal.

As can best be seen in FIG. 12, there is a leveling limit detector circuit which includes a platform 190 consisting of four three-pole mercury switches 192 arranged along the longitudinal and lateral axes 192a, 192b of the vehicle. Level limit circuit 190 is powered by jack switch 186 being closed and checks to see if the vehicle is within prescribed capacity limits in which the vehicle can be leveled. For example, if the longitudinal orientation of a parked vehicle is more than ten degrees off level, the leveling system cannot level the vehicle. If the vehicle is more than fifteen degrees off level in a lateral direction, it cannot be leveled. Thus, the logic of the mercury switches 192 so arranged must be satisfied before a within level limits electrical signal 193 will be output from circuit 190. Preferably, level limit 190 is stacked on a primary level circuit 194 which contains mercury switches 181a through 181d so they are in the same plane and level relative to the vehicle mount by which they are attached.

Referring to FIG. 14, erection of mast 12 will now be briefly described. Upon parking the surveillance vehicle at a surveillance sight, master switch 185 is first closed connecting the system to poWer source 184. Next, a ram switch means 202, electrical switch (SPDT), is closed to a ram up position 202a to produce a ram up signal to actuate master solenoid 130. Power is made available to mast up solenoid 132. The master air passes through line 126a to open main door 14 through actuation of air cylinders 98 and release of door lock cylinder 112. Main door 14 now opens as detected by an electrical door detector, roof limit switch (SPDT) 204, whereupon front and rear ram limit switches (SPDT) 206 and 208, respectively, are power activated. Air solenoid valve 132 is actuated in response to the opening of door 14 as signaled by switch 204. Air pressure is emitted to the ram cylinders 52,54,56 through open solenoid 132. Mast 12 is quickly raised to its erect vertical position by movement of carriage mechanism 24. Upon the mast being erected, lockbar 60 will contact ram up detector switch 208 to signal closure of master solenoid 130 and mast-up solenoid 132. Additionally, at this time, power will be delivered to the pan/tilt mechanism 30 and mast extension system. With master air solenoid 130 off, air through line 126a will be discontinued whereupon the main door air cylinders 98 will be deactuated. Main door 14 will be returned to a closed position by spring action whereupon door lock 106 will be engaged.

With mast erect and the vehicle level, the mechanical/pneumatic mast extension system will be described. Master switch 185 has previously been turned on. Next, mast switch means 210 in the form of an electrical switch B' (SPCT C-O, single pole double throw center off) 210 is moved to a mast extend position 210a (FIG. 14). A failsafe circuit 139 is activated to assure that the vehicle has been leveled within one degree of level before actuating mast solenoid 136. Again, if the vehicle is not within one degree of level, dump valve 138 is activated and the telescoping extension valve 136 is closed by the two outputs of circuit 139. Failsafe circuit 139 may be any conventional level detection surface such as the arrangement of mercury switches shown in FIG. 13 coupled with a relay. The leveling system remains engaged to monitor the level conditions of the vehicle during use. With the vehicle level and the leveling system engaged, air solenoid 136 is activated whereby air is delivered through the low pressure regulator 124 to mast 12. With the mast raised, the mast extension switch 210 is placed in neutral whereupon the solenoid valve 136 and dump valve 138 are closed. In this manner, the height of the mast is maintained by static pressure corresponding to the point at which the telescope switch is placed in neutral. Although switch 210 is opened to failsafe circuit 139, it remains activated through the leveling system to dump air and retract the mast should the vehicle become unlevel.

If it is desired to retract the surveillance system, mast switch 210 is moved to the down position 210b for a mast retract signal whereupon dump solenoid 138 is energized to bleed off air and lower the mast slowly. When the mast is completely retracted (FIG. 14) mast condition detector means 200, in the form of a limit switch, is actuated. This signals the leveling system for retraction of the jacks and the mast retraction assembly A' for retraction of mast 12 to its stowed position of FIG. 2. The jack 142 retract until limit switches 179 are hit whereupon the leveling system is cut off. Latches 176 are hooked by actuation of cylinders 177 to lock the retracted jacks.

The retraction of the nested mast to its stowed concealed configuration will be described. Ram switch means 202 is opened to a ram down position 202b whereupon pan/tilt device 30 is activated to tilt the camera ninety degrees to its stowage position 28a. Power to retraction solenoid 134 is also made available. Mast condition detector 200 in the form of an electrical microswitch (SPDT single pole double throw) signals opening of master air solenoid 130. Solenoid 132 remains closed but is in a vented position. Air is delivered through lines 126a to the door opening solenoids 98 and door release solenoid 112 to open door 14. Door open switch 204 signals actuation of retraction solenoid 134. Air is also delivered through solenoid 134 to ram lock release air cylinder 82 which releases the rear lockbar 60 of the draw frame which moves carriage mechanism 24 and retracts mast 12. Retraction air is supplied to the ends of cylinders 52 and 56 only which are double acting cylinders. Cylinder 54 is vented through solenoid 132 and acts as an air brake in this instance. Air is admitted to ram cylinders 52,56 until the front ram limit switch 206 is hit by carriage mechanism 24 This indicates that the mast is retracted to its stowed position whereupon master solenoid 130 and mast retraction solenoid 134 are deactuated. The main door closes after master solenoid 130 cuts off air supply to door opening air cylinder 98b. The surveillance system is now fully stowed and concealed.

ELECTRICAL CONTROL SYSTEM

The control system for electrically controlling the above described vehicle events and elements will now be described in detail. In describing the circuits, relay contacts will be referred to by lettering beginning with A and increasing alphabetically up through the input side and down the output side to avoid actual lettering of all contacts and undue obscuring of the drawings. For example, in FIG. 15, relay 220 includes input contacts A, B, C, D, and output contacts E, F, G, H, I, J, K, L as illustrated. This lettering format is continued for all relays in accordance with the number of contacts.

Figure 15:
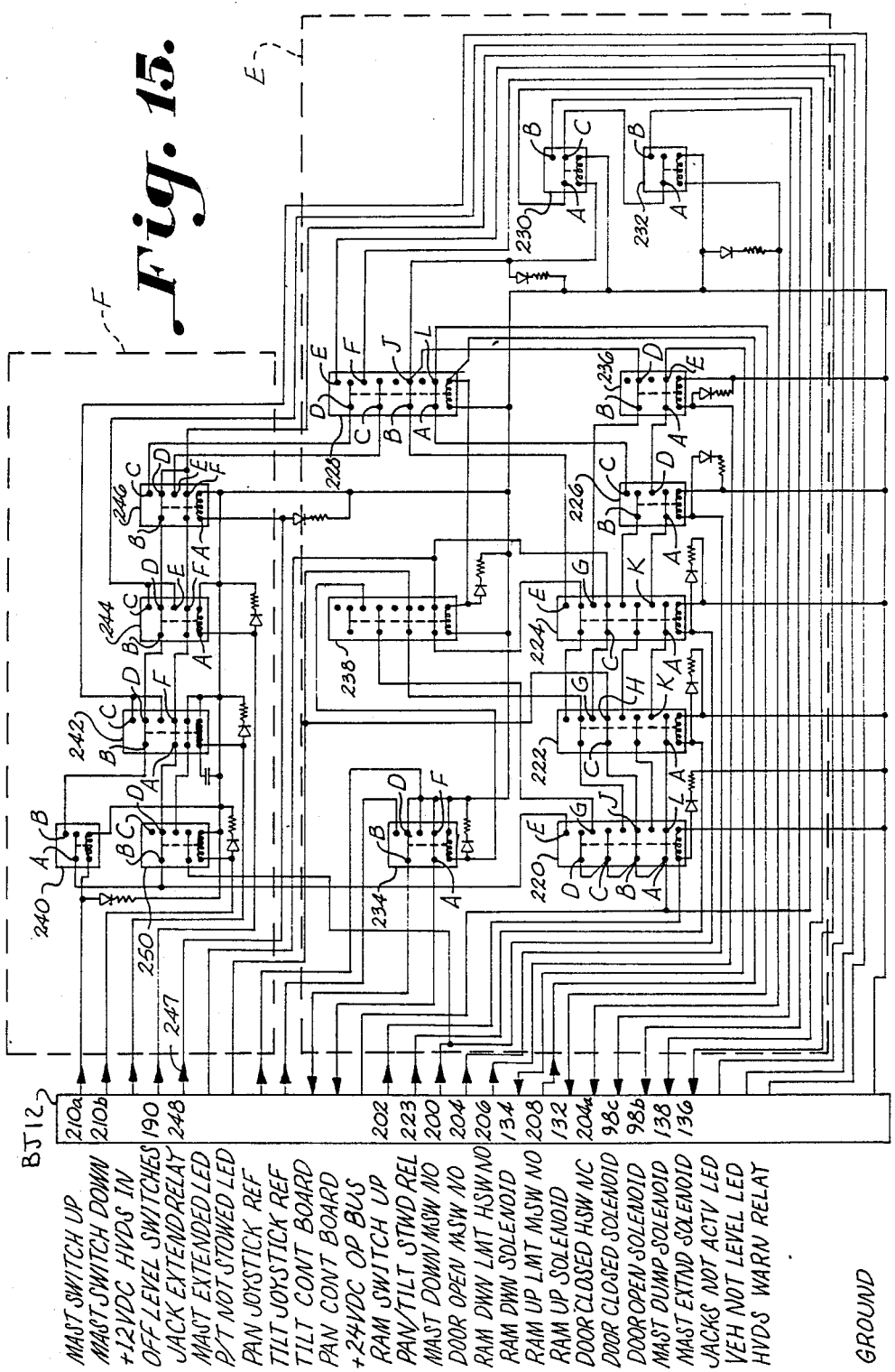
FIG. 15 is a circuit diagram of a surveillance vehicle control system constructed in accordance with the invention illustrating a ram control circuit and a mast control circuit.

FIG. 15 is a schematic diagram of an electrical ram control circuit E and an electrical mast control circuit F. Ram control circuit E provides a ram control means for electrically controlling the ram of FIG. 14 to move mast 12 between its stowed and erect positions. Mast control circuit F provides a means for electrically controlling the extension of mast 12 to its elevated position and the retraction of the mast after surveillance operations are terminated. Table I is a logic chart of the events of ram and mast operation, and may be referred to for further understanding.

RAM CONTROL SYSTEM

Ram Up Cycle

Ram operation will be described in reference to ram control circuit E shown in FIG. 15. First, system master switch 185 (FIG. 14) is closed. Ram switch means 202 is moved to a closed, up position 202a which energizes ram control relay 220. This provides power from the 24 volts operational bus across the input contacts of relay 220. Power from the operational bus is applied to the input contacts of a pan/tilt condition relay 222 from the output contacts of relay 220, except for the lower contacts of relay 222. Relay 222 is switched and controlled by the pan/tilt stow detector means 223 (FIG. 22). This checks to ensure that the pan/tilt mechanism is in the stowed position before the ram is erected. Relay 132 is activated when the tilt is stowed; and relay 134 is activated when the pan is stowed. When the pan and tilt are stowed, a signal from pan/tilt inoperative detector 223 energizes the coil of relay 222. Power from the output contacts of relay 222 enters the input contacts of mast condition relay 224 which is switched by a signal from mast down microswitch 200 (FIG. 14) indicating that the mast is in a retracted, nested configuration. Power from the output contacts of energized relay 224 is applied to the input contacts of main door condition relay 226. Output contact E of relay 224 is connected to an input contact B of ram condition relay 228. Relay 228 is energized by actuation of ram up detector microswitch 208. If the ram is not yet in an erect position, relay 228 is de-energized, and power applied at output contact J of relay 228 energizes the coil of relay 230. Contact A of relay 230 is powered with 24 volts DC and when energized power is applied at output contact B. The power at contact B goes through connector plug BJ12 and activates the door-open air solenoid 98 to open main door 14 (FIG. 10). When door 14 is fully open, door open detector 204 is actuated by the door which energizes the coil of relay 226 making the circuit across contacts B,C of relay 226. Power from output contact C of relay 226 is applied to contact A of relay 228. Relay 228 is energized by a ram up limit microswitch 208 (normally open) which is not yet actuated by the ram being erect. Power at output contact L of relay 228 goes to connector plug BJ12 and to the ram up air solenoid 132 (FIG. 14). The ram up air solenoid allows air to ram cylinders 52, 54, and 56 which erect the mast. When the mast ram reaches the up limit, limit switch 208 energizes the coil of relay 228 and open the contacts to break power to ram up solenoid 132. When ram up microswitch 208 is actuated, the contacts B,J of relay 228 are broken, and power to the coil of relay 230 is stopped. Contacts A,C of relay 230 are then made. This delivers power to contact A of relay 232. The coil of relay 232 is controlled by door closed detector 204a in the form of microswitch (normally closed) (FIG. 10). When main door 14 is open, microswitch 204a is deactivated, closed, and conducting. Relay 232 is energized, and power is supplied across contacts A,B of relay 232. Power from contact B is delivered to door close solenoid 98c. When the door is closed, microswitch 204a opens and the coil of relay 232 is de-energized opening contacts A,B. Power remains shut off when and the door remains closed. This completes the ram up cycle and the ram down cycle will now be described.

Ram Down Cycle

The control system for bringing the ram from its up (mast erect) position to a down (mast retracted) position will now be described in reference to FIG. 15 and ram control means E. Main door 14 remains closed while the mast is erect and extends through secondary door 114. Power to the coil of relay 220 has been previously provided in the ram up cycle by actuation of ram switch 202a on the master console. The switch is turned to the ram down position 202b and the power is lost to the coil of relay 220. When deenergized, power goes from input contacts A,B to output contacts J,L of relay 220. When the pan/tilt is not stowed, relay 222 is not energized and power is also supplied across contacts C,H of relay 222. When the coil of relay 220 is not energized, i.e. the ram down switch 202b is closed, power is not applied across contacts C and G of relay 220. This de-energizes the coil of relay 234 which provides a ground across contacts A and F, and B and D of relay 234. The ground signals from output contacts D and F of relay 234 go to connector plug BJ12 and to the inputs of a pan/tilt control circuit (not shown) providing a stow signal. The stow signal moves the pan and tilt mechanisms of the infrared camera to the stowed position. When the pan and tilt mechanisms are stowed, the coil of relay 222 is energized by a 24 volt signal generated by detector 223 of the pan/tilt control circuit. With the coil of relay 222 energized, power is provided across contacts A K of relay 222 to contact A of relay 224. The coil of relay 224 is energized by mast condition detector 200. The mast must be in the retracted position for this microswitch to be activated. When the mast is down microswitch 200 energizes the coil of relay 224 providing power across contacts A,K of the relay which provides power to contact A of relay 226. At this time main door 14 would still be closed, microswitch 204 open and relay 226 is not energized. The coil of relay 226 is energized by closure of door open microswitch 204 being actuated by the open main roof door 14 (FIG. 10). Power is applied across contacts A,L and B,J of relay 220, across contacts C,G of relay 222; across contacts C,G of relay 224; and to contact B of relay 236. The coil of relay 236 is energized by ram down limit microswitch 206, and is still de-energized. Power applied across contacts B,D of relay 236 energizes the coil on relay 230. Switching of relay 230 provides 24 volt power across contacts A,B of relay 230 to door open solenoid 99, 98b (FIG. 8) to open main door 14. When door 14 opens fully, microswitch 204 is actuated which energizes the coil of relay 226. This provides power across contacts A,D of relay 226 to contact A of relay 236. The coil of relay 236 is controlled by ram down detector microswitch 206. With the ram detector microswitch not yet actuated, contacts A,E of relay 236 will be closed providing power out of contact E to plug BJ12, and to the ram down air solenoid 134 (FIG. 14). When the ram reaches the down position, relay 236 is energized by ram down microswitch 206. This breaks contact between contacts A,E of relay 236 cutting power to the ram down air solenoid 134. When the ram down detector switches relay 236, power across contacts B,D of relay 236 is also broken which terminates power to the coil of relay 230. With relay 230 de-energized power goes across contacts A,C of relay 230 to contact A of relay 232. The coil of relay 232 coil is energized by main door closed microswitch 204a, which is a normally closed switch actuated only when main door 14 is closed. With the door in the open position, the normally closed microswitch maintains relay 232 energized and power goes across contacts A,B of relay 232 to door solenoid 99, 98c. When main door 14 is fully closed, microswitch 204a opens cutting power to the coil of relay 232. This breaks power across contacts A and B of relay 232, and terminates power to door closed air solenoid 98a.

Pan/Tilt Control On

Relay 234 controls the pan/tilt control device 30 which determines whether power is applied for control from the control stick or whether the pan/tilt should be in the stowed position. The coil of relay 234 is energized by power from relay 238 which is controlled by the ram up detector microswitch 206 (FIG. 6). Relay 238 is supplied power from relay 220, which is controlled by ram up switch 202a (FIG. 14) and at the vertical position as indicated by the ram up switch and relay 238 for control by the joy stick to be provided through relay 234.

MAST TELESCOPING SYSTEM

Mast Logic

The functions of the control system for extending mast 12 will now be described in reference to mast control means in the form of mast control circuit F of FIG. 15. When it is desired to extend the mast, the mast switch means 210 is placed in a mast extend position 210a (FIG. 14). When the mast switch is in the extend position 210a, the coil of relay 240 is energized. Power is provided from contact E of relay 220 to contact A of relay 240. The only time power is provided across contact A of relay 240 is when ram up switch 202 is activated and mast switch 210 is in the up position 210a. When both conditions are satisfied, power is provided across contacts A,B of relay 240 to contact B or relay 242. Relay 242 is a latching relay. The coil for relay 242 is controlled and energized by a suitable high voltage power detection system 243 installed in the mast which may be any conventional system for indicating the presence of high voltage sources and the like. If a condition of lightning, high power, or high voltage exists within the proximity or sensitivity of the system, relay 242 is latched on by electrical signal from 243. This provides power across contacts A,B which provides power to a character generator warning the operator on the screen of monitor 27 that a high voltage situation exists. This breaks contact between contacts B,D of relay 242 which discontinues any extension of the mast. With no high voltage detection and no lightning within the air sensed by the system, 24 volt D.C.power is connected across contacts B,C of relay 242 to contact B of relay 244. The coil of relay is energized by the off level mercury switch of the leveling system. If the vehicle is more than one degree off level, the mercury switch energizes the coil of relay 244 stopping the mast extension. Energization of relay 244 breaks contact between contacts B,D of relay 244. Power is then provided across contacts B,C of relay 244 and to the vehicle "not level" warning light on the master console. The coil of a jack activated relay 246 is energized by power from contact B of relay 248 (FIG. 16) which indicates that the jack system has been activated and on at that time. If the jack system has not been activated, the extension on the mast is discontinued by relay 246. Contacts B,C of relay 246 are broken and contact is made between contacts B and D of relay 246. This connects power to the "jacks not activated" warning light 245 on the master console.

Mast Extension

Mast control circuit F will now be described in reference to FIGS. 14 and 15. If the jacks have been activated and relay 246 is energized, power goes across contacts B and C of relay 246 to contact D of relay 228. The coil of relay 228 has been energized by actuation of the ram up detector microswitch 206 (FIG. 4) previously. With ram switch means 202 in ram up position 202a, power is provided across contacts D,E of relay 228 and then through connector plug BJ12 to the mast extension solenoid. With mast switch means 210 in its neutral position the coil of relay 250 is energized, power across contacts B,D of relay 250 goes to contact A of relay 242. The high voltage detection system has not been activated, power is across contacts A,F of relay 242 to contact A of relay 244. The coil of relay 224, controlled by the off level switches is not energized and provides power if the vehicle is within the one degree limits. In this case, power is provided across contacts A,F of relay 244 to contact A of relay 246. The coil is of relay 246 controlled by jack activation relay 248. If the jacks have been activated the coil of relay 246 is energized providing power across contacts A,E and across contacts B,F of relay 228. Relay 228 is the ram up limit relay. If the ram is up, relay 228 is energized and power is applied across contacts C,F of relay 228 to the mast dump solenoid 138 for closure (FIG. 14). It should be noted at this time that the mast dump solenoid remains open. It is a normally open solenoid valve. Power provided to it closes the valve rather than opens it. Therefore, when power is provided to mast dump solenoid 138, the valve closes and allows air to fill the mast. When power is cut off to mast dump solenoid, the air is vented and the mast will collapse.

Mast Retraction

Mast electrical switch means 210 has three positions which are mast extend 210a, neutral 210c, and mast retract 210b. With mast switch 210 in the retract position, power is provided to the coil of relay 250 which opens contracts B,D of relay 250 terminating power to the entire circuit. This opens mast dump solenoid 138 and opens the air solenoid to exhaust air from the mast which is retracted. It is important to note that mast dump solenoid 138 is normally open by power across the contacts of relays 250,242,244,246, and 228. If any one of the relays is opened by the occurrence of the condition they detect, power is lost to the mast air dump solenoid 138, and air is dumped from the mast causing it to retract. For example, if a high voltage condition comes into existence, relay 242 opens and air is dumped. If the hydraulic system fails while the vehicle is level, making the vehicle unstable, an unlevel condition may occur causing mercury switches 182 to energize relay 244 causing air to be dumped.

TABLE I

| RAM AND MAST CONTROL | | |
| --- | --- | --- |
| SEQUENCE SWITCH (GATE) | CONDITION | OUTPUT |
| 10  MASTER POWER SWITCH | ON | GOTO 20 |

TABLE I-continued

RAM AND MAST CONTROL

| | SEQUENCE SWITCH (GATE) | CONDITION | OUTPUT |
|---|---|---|---|
| 20 | RAM SWITCH | OFF | END |
| | | UP | GOTO 30 |
| | | DOWN | GOTO 140 |
| 30 | CHECK PAN/TILT STOWED | STOWED | GOTO 40 |
| | | NOT STOWED | GOTO 80, 1020 |
| 40 | CHECK TELESCOPING MAST | COLLAPSED | GOTO 50 |
| | | EXTENDED | GOTO 1000 |
| 50 | CHECK MAIN DOOR | OPEN | GOTO 60, 90 |
| | | CLOSED | GOTO 90 |
| 60 | CHECK RAM UP LIMIT SWITCH | NOT UP | GOTO 70 |
| | | UP | GOTO 100, 120 |
| 70 | POWER TO RAM UP SOLENOID | OUTPUT | END |
| 80 | STOW PAN/TILT | OUTPUT | END |
| 90 | POWER TO MAIN DOOR OPEN SOLENOID | OUTPUT | END |
| 100 | CHECK DOOR LOCKED SWITCH | LOCKED | END |
| | | UNLOCKED | GOTO 110 |
| 110 | POWER TO MAIN DOOR CLOSE SOLENOID | OUTPUT | END |
| 120 | CONTROL TO PAN/TILT CONNECTED | OUTPUT | END |
| 140 | CHECK PAN/TILT STOWED | STOWED | GOTO 150 |
| | | NOT STOWED | GOTO 80, 1030 |
| 150 | CHECK TELESCOPING MAST | COLLAPSED | GOTO 160 |
| | | EXTENDED | GOTO 1010 |
| 160 | CHECK MAIN DOOR | OPEN | GOTO 170, 90 |
| | | CLOSED | GOTO 90 |
| 170 | CHECK RAM DOWN LIMIT SWITCH | DOWN | GOTO 100 |
| | | NOT DOWN | GOTO 180 |
| 180 | POWER TO RAM DOWN SOLENOID | OUTPUT | END |
| 500 | MAST TELESCOPE SWITCH | UP | GOTO 510, 560 |
| | | NEUTRAL | GOTO 560 |
| | | DOWN | GOTO 620 |
| 510 | ENERGIZE MAST UP RELAY | UP | GOTO 520 |
| | | DOWN | END |
| 520 | CHECK HVDS RELAY | ENERGIZED | GOTO 1040, 640 |
| | | DE-ENERGIZED | GOTO 525 |
| 525 | CHECK VEHICLE WITHIN 1 DEGREE OF LEVEL | LEVEL | GOTO 530 |
| | | NOT LEVEL | GOTO 1050 |
| 530 | CHECK JACKS ACTIVATED | ACTIVATED | GOTO 540 |
| | | NOT ACTIVATED | GOTO 1060 |
| 540 | CHECK RAM UP LIMIT | UP | GOTO 550 |
| | | NOT UP | END |
| 550 | POWER TO MAST EXTEND SOLENOID (OPEN) | OUTPUT | END |
| 560 | CHECK MAST DOWN RELAY | UP | GOTO 570 |
| | | DOWN | END |
| 570 | CHECK HVDS RELAY | ENERGIZED | GOTO 1040, 640 |
| | | DE-ENERGIZED | GOTO 580 |
| 580 | CHECK VEHICLE WITHIN 1 DEGREE OF LEVEL | LEVEL | GOTO 590 |
| | | NOT LEVEL | GOTO 1050 |
| 590 | CHECK JACKS ACTIVATED | ACTIVATED | GOTO 600 |
| | | NOT ACTIVATED | GOTO 1060 |
| 600 | CHECK RAM UP LIMIT | UP | GOTO 610 |
| | | NOT UP | END |
| 610 | POWER TO MAST DUMP SOLENOID (CLOSE) | OUTPUT | END |
| 620 | ENERGIZE MAST DUMP RELAY | NEG OUTPUT | END |
| 640 | CHECK MAST COLLAPSED | COLLAPSED | GOTO 650 |
| | | EXTENDED | END |
| 650 | CHECK MAST DUMP RELAY | DOWN | GOTO 660 |
| | | NOT DOWN | END |
| 660 | RESET HVDS LATCH | OUTPUT | END |
| 1000 | CHECK RAM UP LIMIT SWITCH | UP | END |
| | | NOT UP | GOTO 1010 |
| 1010 | POWER TO MAST EXTENDED WARNING LIGHT | OUTPUT | END |
| 1020 | CHECK RAM UP LIMIT SWITCH | UP | END |
| | | NOT UP | GOTO 1030 |
| 1030 | POWER TO PAN/TILT NOT STOWED LIGHT | OUTPUT | END |
| 1040 | POWER TO HVDS WARNING RELAY (IMAGE) (MAST EXTENSION UNSAFE) | OUTPUT | END |
| 1050 | POWER TO VEH NOT LEVEL LIGHT | OUTPUT | END |
| 1060 | POWER TO JACKS NOT ACTIVATED LIGHT | OUTPUT | END |

Leveling System

Before the mast can be extended as described above, the jack leveling system must be activated and in the process of being deployed. To be activated, the jack switch 186 must be in the extend position generating jack extend signal 186a, and certain must be satisfied. The leveling system uses certain prescribed level limits in which it operates. First, there is the mechanical jack limits to which the system will correct and level from. This is defined as jack system level limits and, as defined by the present system, are 15 degrees lateral and 10 degrees longitudinal. This is implemented by arrangement of mercury switches 192 as can best be seen in FIG. 12. Second, there is a desired safety level limits that is used as a safe range for the extension of mast 12. Preferably, this is about 5 degrees. The leveling system is capable of maintaining the vehicle leveled within about 1 degrees of vertical. Optimum optics for long range surveillance (greater than 5-10 miles) requires about two degrees of vertical. For long range surveillance, the vehicle levelness must be continuously monitored and maintained.

The leveling system is activated by closing jack extend switch 186. This allows current to pass through the system level limit circuit 190 of FIG. 12. If the vehicle is not within the system limits a signal is sent to a warning light 109a on the console panel 27. If the vehicle is within system limits, signal 193 for circuit 190 energizes master relay 252 of the leveling system as can best be seen in FIG. 16. Power is applied across contacts A,K of relay 252 to contact A of park lever condition relay 248. Relay 248 is energized by a signal from park lever microswitch 249 which detects the condition of the lever in park (FIG. 11). If the park lever is in park, relay 248 then energizes the coil of mast extension and jack activated relay 246. Signal 247 is sent from park lever relay 248 to jack activated relay 246 and provides a jack activation signal indicating the mast may now be extended. The mast can now be extended if all other conditions of mast control circuit F are met.

The leveling system will now be described in reference to FIGS. 16, 16A, and 16B showing the leveling control system.

Manual jack switch 186 on the master control panel determines whether the jacks are operational and extended, or retracted. As can best be seen in FIG. 16, relay 252, the master relay, is activated by manual jack switch 186 (FIG. 12) on the master control panel. When the jack switch is closed in an extend position, relay 252 is powered. There are two modes of operation. In the normal mode of operation contacts A,B of relay 256 are plugged and the signal energizing relay 252 is routed through the contacts directly to the coil of relay 252. In a combat or emergency mode of operation, contacts B,C of relay 256 are plugged and relay 256 must be energized by ram switch 202 being in ram up position 202a in order for master relay 25 to be energized. The combat mode allows emergency retraction of all systems with operation of the ram switch to retract position 202b. This interrupts power to jack mast relay 252 causing immediate jack retraction and interrupts power to mast extension relay 246, collapsing the mast. The ram is also actuated and retracts. Thus the vehicle may be driven as soon as the jacks are retracted and brakes unlocked for quick escape under combat and the like emergency conditions.

Leveling Logic

In normal operation, power is applied across contracts A,K of relay 252 to energize master unlock relay 258 for jack extension through contacts A,D of park lever condition relay 248. If the transmission park lever is not in park, the park lever condition relay 248 is not energized. The signal stops there and sends the warning back to a vehicle "not in park" warning light 249a on the master indicator panel. If the vehicle transmission is in the park position, power is passed through relay 248 to unlock relay 258, and a jack and brake condition relay set G consisting of relays 260c, 260b, 260d, 260a and 267. Jack condition relays 260c, 260b, 260d, and 260a are the jack unlock relays for the right front, left front, right rear, and left rear jacks, respectively. Master unlock relay 258, when energized, powers a master solenoid 89 (FIG. 17) to a jack unlock and brake lock position. This unlocks the jack locks 177 and jack legs 142 at the respective vehicle corners, and locks the wheel brakes. When the jacks are unlocked, as indicated by jack unlock detector switches 178 at the jack locks, relays 260c, 260b, 260d and 260a, are energized.

As can best be seen in FIG. 11, a double action hydraulic cylinder 268, controlled by solenoid 89, moves a brake pedal linkage 269b between a brake locked and a brake unlocked condition. Brake condition relay 267 is energized by a signal 269a from a brake lock detector microswitch 269 detecting movement of brake pedal linkage 269b. Brake lock detector 269 is energized by the brake linkage being moved by hydraulic cylinder 268 to engage and lock the wheel brakes. The hydraulic cylinder is actuated by fluid from master unlock solenoid 89 which is controlled by master unlock relay 258. The unlock side 89A of the solenoid sends fluid to cylinders 177 to unlock the jacks and simultaneously to the brake lock cylinder at 268A. With the jacks unlocked and brake locked conditions satisfied, power is provided through this relay set to an extend current amplifier circuit H which consists of transistors 270, 271 which amplify power for jack extension and leveling logic. If jack and brake lock conditions have not been met, condition relay set G discontinues the jack extension process, and sends an appropriate warning to an indicator warning light on the control panel.

As can best be seen in FIG. 16A, system pressure is regulated by a pressure regulating circuit which senses and adjusts the system pressure. The circuit consists of transistor block 272 and an adjustable potentiometer 274. Adjustment of the system pressure is made by adjusting potentiometer 274 to the desired system pressure. The output from transistor block 272 goes to pump control relay 276 which turns the hydraulic pump on and off according to the pressure needs of the system. Power to the pump control system is provided by relay 276, transistor block 272, and potentiometer 274 when park lever relay 248 is energized by the park lever position switch, and the master unlock extension relay 258 is energized. Power goes across contacts A,E of master unlock relay 258 to relay 276. With the jack and brake lock condition relays satisfied, the jack locks are unlocked, the brake lock is locked, and system pressure is maintained. Power is then provided to extend current amplifier H, to the system pressure regulating circuit; and to a jack leveling logic circuit C.

Jack Extension

As can best be seen in FIG. 16B, jack leveling logic circuit C includes four jack level relays 280a, 280b, 280c and 280d, and four jack pressure relays 290a, 290b, 290c, and 290d for the left rear, left front, right front, and right rear jacks, respectively. As can best be seen in FIG. 16A, jack pressure control circuit D consists of four separate jack pressure circuits 294a, 294b, 294c, and 294d which output pressure control signals 183a, 183b, 183c, and 183d, having a digital value of 1 when actual jack pressure is greater than or equal to system reference pressure at respective vehicle jacks at corners a, b, c, and d. The pressure control signals are transmitted directly to jack leveling logic circuit C. The four mercury switch signals 182a, 182b, 182c, and 182d at the four vehicle corners are input into jack leveling logic circuit C. Level relays 280a and 280c, and pressure relays 290a and 290c form a first jack logic relay set for leveling the diagonal left rear and right front jacks and corners of the vehicle. Level relays 280a and 280c are energized by opposite mercury level switches 182c and 182a, respectively. Pressure relays 290a and 290c are energized by pressure circuits 294a and 294c, respectively. Leveling logic circuit C further includes a second jack logic set for leveling the diagonal left front and right rear corners which includes level relays 280b and 280d, and pressure relays 290b and 290d grouped together. Level relays 280b and 280d are controlled by opposite level switches 182a and 182b, respectively. Pressure relays 290d and 290b are controlled by pressure circuits 294d and 294b respectively.

Leveling logic C balances the jacks at opposing ends of diagonals 180a, 180b (FIG. 11) against each other in response to off level signals and jack pressure control signals until prescribed level conditions and systems jack pressure exists. Leveling logic circuit C is best described by referring to the jacks at the corners of one axis 180a, only. It being understood that the jacks at the corners of axis 180b are being controlled interactively and are undergoing balancing at the same time as the jacks on axis 180a. Leveling logic circuit C controls the jack drive of the four mechanical jacks B arranged diagonally at the corners of an x-axis of the vehicle. Level detector means 181a, 181b, 181c and 181d sense the level condition of the vehicle near the corners and generate an off-level signal 182a, 182b, 182c and 182d when the level condition deviates from a prescribed level condition. Pressure sensor means 170a, 170b, 170c and 170d senses the pressure of the jacks against the ground and generates an actual jack pressure signal. A desired system reference pressure is set in the system at potentiometers 306a, 306b, 306c and 306d corresponding to a desired jack pressure against the ground. Pressure control circuit D compares the actual pressure signals 172 to system reference pressure signals 174 preset in potentiometers 306. A pressure control signal 183a, 183b, 183c and 183d is generated when actual pressure is greater than or equal to system pressure at a given corner.

The jacks are grouped together in pairs for interactive control. For example, a first pair includes first and second jacks 142c and 142a at opposing ends of diagonal 180a, corresponding to first and second vehicle corners "d" and "a", respectively. First and second off-level signals 182d and 182a are generated for the respective corners, as are first and second pressure control signals 183d and 183a. As can best be seen in FIG. 16B, leveling logic circuit C comprises for diagonal axis 180a, a first level circuit 280c which receives second off-level signal 182a from second vehicle corner "a"; and a second level circuit 280a which receives first off-level signal 182c from first vehicle "c". A first pressure circuit 290c receives first pressure signal 183c from the first corner; and a second pressure circuit 290a receives second pressure signal 183a from the second corner. First level circuit 280c is connected to second pressure circuit 290a which is connected to left rear jack drive 158A, 150a for extending second jack 142a in response to second off level signal 182a. Second level circuit 280a is connected to first pressure circuit 290c which is connected to right front jack drive 162A, 150c for extending first jack 142c in response to first off level signal 182c. First pressure circuit 290c is connected to jack drive 162A to extend first jack 142c in response to first pressure signal 183c being off, i.e. 183c is a digital 0. This occurs when the pressure of jack 142c is less than reference pressure. First pressure circuit 290c is responsive to first pressure signal 183c being on, i.e. 183c is a digital 1, and second off-level signal 182a to retract first jack 142c via solenoid 162B. Second pressure circuit 290a is connected to jack drive 158A to extend second jack 142a in response to second pressure signal 183a. Second pressure circuit 290a is responsive to second pressure signal 183a and first off-level signal 182c to retract second jack 142a.

First and second level circuits 280c, 280a each include a first logic circuit (contacts A,E,F) and a second logic circuit (contacts B,C,D). The first logic circuit (A,F) of second level circuit 280a is connected to first level circuit 280c and second pressure circuit 290a for transmitting the extend jack signal to drive solenoid 158A in response to second off-level signal 182c. The second logic circuit of second level circuit 280a interrupts and disables the first logic circuit in response to a first off-level signal 182c. This is to prevent extension of left rear jack 142a when the right front jack 142c is low. This prevents overcontrol of the jacks in the event of synchronous oscillations that may occur in the system, i.e. mercury switch sloshing.

First pressure circuit 290c includes a first logic circuit (contacts A, E, and F) and a second logic circuit (contacts B, C, and D). The first logic circuit has an input (A) connected to first level circuit 280a, and a first output (E) connected to jack drive 162B for retracting first jack 142c in response to first pressure signal 183c being a digital signal of 1 and second off-level signal 182a being a digital signal of 1. As described previously pressure control signals 183a, 183b, 183c, and 183d are 0 (no signal) when actual jack pressure is less than set system pressure and 1 (positive signal) when actual jack pressure is equal to or greater than set system pressure. Off level signals 182a, 182b, 182c, and 182d are a digital 0 when the respective level sensor indicates a prescribed degree of levelness (i.e., within one degree of level), or is high; and a digital 1 when a respective level sensor indicates a condition of less than one degree low. A second output (F) of the first logic circuit is connected to second level circuit 280a (second logic circuit B,D of the second level circuit) and jack drive 158A for extending second jack 142a in response to first pressure signal 183c being 0, and off level signal 182a being 1. The second logic circuit of first pressure circuit 290c has an input (B) connected to first level circuit 280c, and an output (D) connected to jack drive 162A for extending first jack 142c.

Second pressure circuit 290a includes a first logic circuit (contacts A, E, and F) and a second logic circuit (contacts B, C, and D). The first logic circuit has an input (A) connected to second level circuit 280a, a first output (E) connected to jack drive 158B for retracting second jack 142a in response to second pressure signal 183a being one, and off level signal 182c being 1. The first logic circuit has a second output (F) connected to first level circuit 280c (second logic circuit B,D of the first level circuit) and to jack drive 162A for extending first jack 142c in response to second pressure signal 183a being 0 and off level signal 182c being 1. The second logic circuit of second pressure circuit 290a has an input (B) connected to second level circuit 280a and an output (D) connected to jack drive 158A for extending second jack 142a.

This method of jack and level control allows for a mean pressure reference to be set for all leveling jacks and prevents the diagonally opposed jacks from fighting each other during the leveling operation, i.e. jack 142a cannot extend if jack 142c is being extended in response to the combination of an appropriate off level signal and pressure signal. Also it should be noted that it is possible for only one off level signal per diagonally opposed pair of jacks to exist at a time, i.e. if the left rear is low, then the right front cannot also be low. Also, it should be noted that if no off level condition is sensed in the respective diagonally opposed level sensors, then both jacks are free to simultaneously extend until each actual individual jack pressure is equal to the set system reference pressure.

In accordance with the invention a method of controlling a leveling system is disclosed which includes sensing the level conditions of the four corners of the vehicle and generating off-level signals when a corner is low. The pressure of the jacks at each corner is sensed and a jack pressure signal is generated. A system reference pressure signal is established based on the weight that each jack lifts. Next, the method contemplates processing the off-level signals, jack pressure signals, and system pressure signals in a leveling logic circuit. In the method, the jack drives for retracting and extending the diagonal jacks are controlled by sensing an off-level signal at a low corner jack, extending the low corner jack if the jack pressure on the high corner jack is below system pressure, retracting the high corner jack if the pressure of the high corner jack is greater or equal to system pressure, terminating extension of the low corner jack when the off-level signal is extinguished, and terminating the extension and retraction of the high corner jack when system reference pressure is reached on the high corner jack.

The method contemplates controlling the low corner and high corner jacks in response to the off-level signal by first determining whether actual jack pressure is above or below system pressure. If above system pressure, the method retracts the high corner jack, and if below system pressure extends the low corner jack until the actual pressure signal of the high corner jack is above system pressure, or the off-level signal is terminated. The low corner and high corner jacks are controlled, when actual pressure on the high corner jack is greater or equal to the system pressure, by retracting the high corner jack until actual pressure is below system pressure, and extending the low corner jack until the off-level signal is terminated, or the high corner jack pressure is greater or equal to system pressure. The above steps are repeated if the high corner jack pressure is greater or equal to the system pressure until the off-level signal is terminated. The above steps are terminated if the low corner jack extension is terminated in response to the off-level signal termination.

Further, the method contemplates controlling the jack drive when the off-level signal is zero and the actual pressure is below system pressure at least one corner jack by extending the corner jack until the actual pressure is equal to system pressure.

The operation of the jack logic sets will now be described in a simplified left rear and right front jack levelization sequence. Assume that a signal is received from the left rear mercury switch 182a via connector plug BJ8 indicating that the left rear of the vehicle is low and needs to be brought up to level. Switch 181a is closed and a signal 182a from the switch energizes the coil of right front relay 280c. Power is applied across contacts A,F of relay 290c. Relay 290c is controlled by the right front jack pressure circuit 294c and pressure control signal 183c. At this point it will be noted that because pressure control signals 183a–183c are digital signals, i.e. either 0 (off) or 1 (on), they switch pressure relays 290a–290d off and on. In this sense, the mercury switch, level condition signals 182a–182d are also digital signals and switch the level relays on and off. If system reference pressure is not sensed on the right front jack by transducer 170c, this is taken as an indication that the right front jack is not extended. A zero pressure control signal 183c is generated by right front jack pressure circuit 294c and sent to right front relay 290c. Relay 290c is de-energized and power goes across lower contacts A,F of relay 290c back to contact B of left rear relay 280a. There is no signal from right front mercury switch 181c to left rear relay 280a because, if the left rear is low, the right front is high and switch 181c is open. Since there is no signal 182c at this time from right front mercury switch 181c, relay 280a is de-energized. Accordingly, relay 280a is de-energized and the power is applied across contacts A,F of relay 280a to contact B of relay 290a. Relay 290a is de-energized because sufficient pressure has not been placed on left rear jack 142a. Power from relay 280a across contacts B,D of relay 290a is then provided to a left rear jack extension solenoid 158A which extends the left rear jack. As the left rear corner is raised, a level condition is reached and the left rear mercury switch 182a opens which de-energizes the coil of relay 280c. This stops jack extension power through relays 290c, 280a, and 290a. Left rear jack extension is stopped. With relay 280c de-energized, power is applied across lower contacts A,F of relay 280c and across upper contacts B,D of relay 290c to apply power to right front jack extension solenoid 162A for extending the right front jack. This continues until actual pressure 172c sensed by pressure transducer 170c of the right front jack reaches preset pressure 174c. A pressure control signal 183c of 1 is then sent by right front jack pressure circuit 294c to energize the coil of relay 290c and break its contacts. When the pressure is reached on the jacks, relays 290a and 290c will be energized reversing the logic input. It will be noted that the left rear and right front corner jacks are electrically and mechanically controlled and activated as a pair together. At the same time, right rear and left front will be controlled and activated as a pair by a parallel process by level relays 280d and 280b, and pressure relays 290d and 290b. This results in the vehicle being initially leveled upon being parked at a desired surveillance site. However, due to hydraulic leaks in the leveling system which are inevitable, changing ground conditions, and other changing conditions, this initial level condition may be lost. The control system contemplates this and uses a method termed inverse logic to maintain the level condition as the levelness is continuously monitored and corrected.

The term inverse logic means that a high corner jack will first be retracted before a low corner jack is extended. This method is used to prevent the vehicle from being jacked into the air with the wheels entirely off the ground. The logic input reversal will now be described. After initial levelization, system pressure is on the jacks against the ground and pressure relays 290 are all energized. Contact is made across the contacts A,E of the pressure relays 290a, 290b, 290c, and 290d. If an off level condition occurs due to shifting sand, unstable conditions or internal leakage of the hydraulic system, the system will correct now by retracting a diagonally opposed high corner jacks first until reference pressure is reached or the off level condition is corrected. If system pressure is reached on the high corner jack before the off level is corrected, the low corner jacks will be extended until the off level condition is corrected. Then, if necessary, reextension of the previous high corner jacks is done to reestablish system pressure. This prevents unstable conditions and continually causing the jack system from reaching the upper extension limits of the jacks causing jacking of the vehicle excessively into the air. The inverse logic will now be described in detail and in reference to level logic circuit C and FIG. 16B.

If system jack pressure is lost at any of the jacks after initial levelization and level conditions are not lost, the corresponding pressure relay will be energized by the pressure control circuit. For example, if left rear jack 142a looses system pressure, signal 183a becomes zero and relay 290a is de-energized closing contacts B,D of relay 290a. This applies power directly to the left rear extend solenoid 158A. The left rear jack is extended until system pressure is sensed on the jack. Pressure relay 290a is energized by a signal 183a interrupting power to solenoid 158A and jack extension.

If level conditions are lost, level conditions signals from the low corner mercury switches will be generated. Only one or two of the corners along the X-axis can be low at one time. If, for example, the signal from the left rear level sensor 182a indicates that the left rear of the vehicle is low as perceived by the system, the condition is treated by inverse logic as follows. Pressure on the right front jack is sensed by transducer 170c and an actual jack pressure signal 172c is transmitted to pressure control circuit 294c. Circuit 294c compares the actual pressure signal 172c from transducer 170c to the preset pressure signal 174c. If actual pressure signal 172c is greater than or equal to system reference pressure signal 174c, an on pressure control signal 183c of 1 is sent to energize relay 290c. Relay 290c is energized providing power to right front retract solenoid 162B retracting the right front jack until a signal received from pressure sensor 170c indicates jack pressure is less than preset reference pressure. Pressure control circuit 294c de-energizes relay 290c when signal 183c goes to off or 0. If actual pressure signal 172a is initially less than reference pressure, relay 290c remains de-energized from the beginning.

In the above operation, the high corner right front jack continues to be retracted by retraction solenoid 162B until one of two conditions is met. First, lack of a signal 182a from the left rear level switch 182a, indicating that the vehicle is level, which de-energizes relay 280c. This interrupts power to level relay 280c and pressure relay 290c terminating jack retraction. Second, jack system pressure is reached on the right front jack as sensed by sensor 170c and controlled by pressure control circuit 294c, would deenergize relay 290c ceasing retraction of the high corner right front jack via solenoid 162B, as described in more detail above. If the left rear level sensor 182a still indicates a low condition, then power is provided through relay 280a to the left rear extension solenoid 158A extending the left rear jack until the left rear level sensor 182a indicates level is reached. If extending the left rear jack has not placed reference pressure on the right front jack, as sensed by pressure sensor 170c, power is provided through relay 290c from de-energized relay 280c, and the right front extension solenoid 162A is activated. The right front is raised until reference pressure is reached and sensed by pressure sensor 170c. When this reference pressure is reached, pressure control circuit 294c energizes relay 290c which breaks contacts B,D and power to right front jack extension solenoid 162A. This would complete the cycle for level maintenance of the vehicle while operational.

Referring now to FIG. 16A, the jack pressure control circuits 294a through 294c, only circuit 294c will now be described in detail since the control circuits are each in identical. Pressure control circuit 294c includes an operational amplifier having a first NPN (negative - positive - negative) transistor 302 whose base is connected to jack pressure transducer 170c (FIG. 17) and jack pressure signal 172c. Transducer 170c has a variable wiper arm 304 which picks up the pressure in the hydraulic line to right front jack drive cylinder 150c. The collector of transistor 302 is connected to the base of a PNP (positive - negative - positive) transistor 305. The emitter of transistor of 302 is connected to a wiper 307 of a potentiometer 306c having a resistor 308. The collector of transistor 305 is connected to the coil of relay 290c, and the emitter of transistor 305 is connected to the positive side of potentiometer 306c. The negative side of potentiometer 306c is connected to a ground bus.

In operation, as pressure increases the wiper 304 of transducer 170c slides along the scale of potentiometer 304a changing the reference on the wiper from ground to a more positive reference represented by jack pressure signal 172c. When the potential on the preset wiper 307 and transducer wiper 304 are equal, no current travels through the base of transistor 302 and no current travels from the collector of 302 to the base of 305. This switches pressure control circuit 294c to an off condition and relay 290c is de-energized. When the reference potential of set transducer wiper 307 is more positive than the reference wiper 304, current flows through the base and emitter of transistor 302. This base emitter current provides a collector current of 302 which switches transistor 305 on. Pressure control circuit 294c is switched on which produces a positive pressure control signal 183c of 1 flowing from the emitter and collector of transistor 307 and to relay 290 energizing the relay. Retraction solenoid 162B is then actuated so that the right front jack retracts. Pressure control circuit 294c is activated by the more positive reference on wiper 307 of potentiometer 306c reached on the corresponding jack. This pressure on the jack can be set by transducer wiper 307 anywhere from zero to 5000 pounds. Typically, in this installation it is set at approximately 700 pounds. Since the pressure on the jack corresponds to the amount of back pressure in the hydraulic system for driving that jack, the pressure can be accurately measured by pressure control circuit 294c. When the reference potential of wiper 304 is less positive than set potentiometer wiper 307, no current flows through either transistor 302 or 305 and pressure circuit 294c is effectively switched off. In addition, the jack would be either off the ground or not enough pressure on the jack against the ground; such as when the jacks are extending initially of retracting.

Jack Retraction

Retraction of the jacks is accomplished by placing jack switch 186 in the jack retract position. This deenergizes relay 252 which sends a signal to mast condition relay 310. Relay 310 is energized when the mast is in the nested, retracted position by an electrical signal from mast down condition detector microswitch 200. When the mast is down a signal is sent from relay 310 to a jack retraction current amplifier H consisting of transistor 312 and transistor 314. Power from current amplifier H enters a bus which connects to contacts of a set J of jack retract condition relays 316, 318, 320 and 322. Relay 322 is the left jack retraction relay and relay 318 is for the right rear jack. Relay 320 is the left front jack retraction relay, and relay 322 is for the right front jack. Relays 316, 318, 320 and 322 are energized by corresponding jack up limit microswitches. Initially, all jacks are down, and the jack switch is in the retract position energizing all the relays. Power is provided across contacts A,E of the energized relays 316, 318, 320 and 322 to actuate corresponding retraction solenoids 164b, 158B, 160B and 162B. This causes the jacks to retract. The current is also supplied through relays 316, 318, 320 and 322 to the coil of master unlock (retract) relay 324 energizing the unlock side of master jack lock solenoid 89A. When the jacks retract to the full up limit position the microswitches are actuated to de-energize relays 316, 318, 320 and 322. This deenergizes relay 324 and supplies power through the upper contacts D,E of relays 260c, 260b, 260d, 260a and 267, to lock side 89b of master jack lock solenoid 89. The lock side of master jack lock solenoid 89 is energized until relays 260c, 260b, 260d, 260a and 267 are de-energized by their controlling lock microswitches, indicating the jacks are each locked, which discontinues the operation. When relays 260c, 260b, 260d, 260a and 267 have been de-energized this also disconnects the power to pump control relay which shuts the pump down.

| | JACK AND LEVEL CONTROL | | |
|---|---|---|---|
| | SEQUENCE SWITCH (GATE) | CONDITION | OUTPUT |
| 10 | MASTER POWER SWITCH | ON | GOTO 20 |
| | | OFF | END |
| 20 | JACK SWITCH* | EXTEND | GOTO 30 |
| | | RETRACT | GOTO 420, 660, 670 680, 690, 700 |
| 30 | POWER TO LEVEL LIMIT SWITCHES | IN LIMITS | GOTO 40 |
| | | OUT OF LIMITS | GOTO 1050 |
| 40 | CHECK PARK LEVER | IN PARK | GOTO 50 |
| | | NOT IN PARK | GOTO 1110 |
| 50 | POWER TO HYDRAULIC PUMP CONTROL CIRCUIT | OUTPUT | GOTO 60 |
| 60 | ACTIVATE MASTER SOLENOID "UNLOCK" | OUTPUT | GOTO 70 |
| 70 | CHECK RF JACK LOCK | UNLOCKED | GOTO 80 |
| | | LOCKED | END |
| 80 | CHECK IF JACK LOCK | UNLOCKED | GOTO 90 |
| | | LOCKED | END |
| 90 | CHECK RR JACK LOCK | UNLOCKED | GOTO 100 |
| | | LOCKED | END |
| 100 | CHECK IR JACK LOCK | UNLOCKED | GOTO 110 |
| | | LOCKED | END |
| 110 | CHECK BRAKE LOCK | UNLOCKED | END |
| | | LOCKED | GOTO 120, 121, 122 123 |
| REM | JACK LEVEL SEQUENCE GROUP | | |
| 120 | POWER TO RF MERCURY SWITCH | LOW | GOTO 130 |
| | | HIGH | GOTO 290 |
| 121 | POWER TO LF MERCURY SWITCH | LOW | GOTO 170 |
| | | HIGH | GOTO 310 |
| 122 | POWER TO RR MERCURY SWITCH | LOW | GOTO 210 |
| | | HIGH | GOTO 330 |
| 123 | POWER TO LR MERCURY SWITCH | LOW | GOTO 250 |
| | | HIGH | GOTO 350 |
| 130 | CHECK LR PRESSURE CIRCUIT | LOW | GOTO 140 |
| | | HIGH | GOTO 160 |
| 140 | DISABLE LR PRESSURE CIRCUIT | OUTPUT | GOTO 150 |
| 150 | POWER TO RF EXTEND SOLENOID | OUTPUT | GOTO 1060 |
| 160 | POWER TO LR RETRACT SOLENOID | OUTPUT | GOTO 1090 |
| 170 | CHECK RR PRESSURE CIRCUIT | LOW | GOTO 180 |
| | | HIGH | GOTO 200 |
| 180 | DISABLE RR PRESSURE CIRCUIT | OUTPUT | GOTO 190 |
| 190 | POWER TO LF EXTEND SOLENOID | OUTPUT | GOTO 1070 |
| 200 | POWER TO RR RETRACT SOLENOID | OUTPUT | GOTO 1080 |
| 210 | CHECK LF PRESSURE CIRCUIT | LOW | GOTO 220 |
| | | HIGH | GOTO 240 |
| 220 | DISABLE LF PRESSURE CIRCUIT | OUTPUT | GOTO 230 |
| 230 | POWER TO RR EXTEND SOLENOID | OUTPUT | GOTO 1080 |

-continued
JACK AND LEVEL CONTROL

| | SEQUENCE SWITCH (GATE) | CONDITION | OUTPUT |
|---|---|---|---|
| 240 | POWER TO LF RETRACT SOLENOID | OUTPUT | GOTO 1070 |
| 250 | CHECK RF PRESSURE CIRCUIT | LOW | GOTO 260 |
| | | HIGH | GOTO 280 |
| 260 | DISABLE RF PRESSURE CIRCUIT | OUTPUT | GOTO 270 |
| 270 | POWER TO LR EXTEND SOLENOID | OUTPUT | GOTO 1090 |
| 280 | POWER TO RF RETRACT SOLENOID | OUTPUT | GOTO 1060 |
| 290 | CHECK RF PRESSURE CIRCUIT | LOW | GOTO 300 |
| | | HIGH | END |
| 300 | CHECK RF DISABLE CIRCUIT | WORKING | GOTO 150 |
| | | DISABLED | END |
| 310 | CHECK LF PRESSURE CIRCUIT | LOW | GOTO 320 |
| | | HIGH | END |
| 320 | CHECK LF DISABLE CIRCUIT | WORKING | GOTO 190 |
| | | DISABLED | END |
| 340 | CHECK RR PRESSURE CIRCUIT | LOW | GOTO 360 |
| | | HIGH | END |
| 360 | CHECK RR DISABLE CIRCUIT | WORKING | GOTO 230 |
| | | DISABLED | END |
| 370 | CHECK LR PRESSURE CIRCUIT | LOW | GOTO 380 |
| | | HIGH | END |
| 380 | CHECK LR DISABLE CIRCUIT | WORKING | GOTO 270 |
| | | DISABLED | END |
| REM | RETRACT JACKS | | |
| 400 | CHECK J1 PLUG | OPEN | GOTO 410 |
| | | CLOSED | GOTO 20 |
| 410 | RAM SWITCH | UP | GOTO 20 |
| | | DOWN | GOTO 420, 660, 670, 680, 690, 700 |
| 420 | CHECK RF JACK LOCK | LOCKED | GOTO 430 |
| | | UNLOCKED | GOTO 470 |
| 430 | CHECK LF JACK LOCK | LOCKED | GOTO 440 |
| | | UNLOCKED | GOTO 470 |
| 440 | CHECK RR JACK LOCK | LOCKED | GOTO 450 |
| | | UNLOCKED | GOTO 470 |
| 450 | CHECK LR JACK LOCK | LOCKED | GOTO 460 |
| | | UNLOCKED | GOTO 470 |
| 460 | CHECK BRAKE LOCK | LOCKED | GOTO 470 |
| | | UNLOCKED | END |
| 470 | POWER TO HYDRAULIC PUMP CONTROL CIRCUIT | OUTPUT | GOTO 480 |
| 480 | CHECK RF UP LIMIT SWITCH | UP | GOTO 490 |
| | | DOWN | GOTO 520 |
| 490 | CHECK LF UP LIMIT SWITCH | UP | GOTO 500 |
| | | DOWN | GOTO 520 |
| 500 | CHECK RR UP LIMIT SWITCH | UP | GOTO 510 |
| | | DOWN | GOTO 520 |
| 510 | CHECK LR UP LIMIT SWITCH | UP | GOTO 600 |
| | | DOWN | GOTO 520 |
| 520 | POWER TO MASTER SOLENOID "UNLOCK" | OUTPUT | GOTO 540 |
| 540 | CHECK J2 PLUG | OPEN | GOTO 550 |
| | | CLOSED | GOTO 560 |
| 550 | CHECK MAST TELESCOPE POSITION | EXTENDED | GOTO 1100, |
| | | COLLAPSED | GOTO 560, 570, 580, 590 |
| 560 | CHECK RF UP LIMIT SWITCH | UP | END |
| | AND | DOWN | GOTO 280 |
| 570 | CHECK LF UP LIMIT SWITCH | UP | END |
| | AND | DOWN | GOTO 240 |
| 580 | CHECK RR UP LIMIT SWITCH | UP | END |
| | AND | DOWN | GOTO 200 |
| 590 | CHECK LR UP LIMIT SWITCH | UP | END |
| | | DOWN | GOTO 160 |
| 600 | CHECK RF JACK LOCK | LOCKED | GOTO 610 |
| | | UNLOCKED | GOTO 650 |
| 610 | CHECK LF JACK LOCK | LOCKED | GOTO 620 |
| | | UNLOCKED | GOTO 650 |
| 620 | CHECK RR JACK LOCK | LOCKED | GOTO 630 |
| | | UNLOCKED | GOTO 650 |
| 630 | CHECK LR JACK LOCK | LOCKED | GOTO 640 |
| | | UNLOCKED | GOTO 650 |
| 640 | CHECK BRAKE LOCK | LOCKED | GOTO 650 |
| | | UNLOCKED | END |
| 650 | POWER TO MASTER SOLENOID "LOCK" | OUTPUT | END |
| 660 | CHECK RF JACK LOCK | LOCKED | END |
| | | UNLOCKED | GOTO 1010 |
| 670 | CHECK LF JACK LOCK | LOCKED | END |
| | | UNLOCKED | GOTO 1020 |

| | JACK AND LEVEL CONTROL | | |
|---|---|---|---|
| | SEQUENCE SWITCH (GATE) | CONDITION | OUTPUT |
| 680 | CHECK RR JACK LOCK | LOCKED | END |
| | | UNLOCKED | GOTO 1030 |
| 690 | CHECK LR JACK LOCK | LOCKED | END |
| | | UNLOCKED | GOTO 1040 |
| 700 | CHECK BRAKE LOCK | LOCKED | GOT 1050 |
| | | UNLOCKED | END |
| 1000 | RF JACK UNLOCKED WARNING LIGHT | OUTPUT | END |
| 1010 | LF JACK UNLOCKED WARNING LIGHT | OUTPUT | END |
| 1020 | RR JACK UNLOCKED WARNING LIGHT | OUTPUT | END |
| 1030 | LR JACK UNLOCKED WARNING LIGHT | OUTPUT | END |
| 1040 | BRAKE LOCKED WARNING LIGHT | OUTPUT | END |
| 1050 | OVER LEVEL LIMITS WARNING LIGHT | OUTPUT | END |
| 1060 | RF JACK ACTIVATED INDICATOR LIGHT | OUTPUT | END |
| 1070 | LF JACK ACTIVATED INDICATOR LIGHT | OUTPUT | END |
| 1080 | RR JACK ACTIVATED INDICATOR LIGHT | OUTPUT | END |
| 1090 | LR JACK ACTIVATED INDICATOR LIGHT | OUTPUT | END |
| 1100 | MAST EXTENDED WARNING LIGHT | OUTPUT | END |
| 1110 | VEHICLE NOT IN PARK WARNING LIGHT | OUTPUT | END |

While a preferred embodiment of the invention has been described using specific terms, such description is for illustrative purposes only, and it is to be understood that changes and variations may be made without departing from the spirit or scope of the following claims.

What is claimed is:

1. A control system for a rapid deployment surveillance vehicle having a vehicle cab with a roof door through which an instrument for surveillance and the like may be deployed from a concealed stowed position within said vehicle cab to an elevated position extended through a door opening of said roof door high above the vehicle; said vehicle being of the type having a telescoping mast which has a telescoped retracted position and a telescoped extended position; a ram for moving the retracted mast between a generally horizontal stowed position and vertical erect position; a mast operator for moving said mast between said telescoped retracted and extended positions; a leveling system having a plurality of jacks carried on said vehicle for establishing a prescribed level condition of said vehicle with respect to ground; said control system comprising:

(a) electrical ram switch means electrically connected to said ram control means having a ram up signal and ram down signal for switching said ram control means to move said mast;

(b) electrical mast switch means electrically connected to said mast control system having a mast extend signal and a mast retract signal for switching said mast control means to move said mast;

(c) ram detector means for electrically detecting a ram down condition of said ram in which said mast and instrument are in said stowed position and generating a ram down condition signal, said ram detector means detecting a ram up condition in which said mast and instrument are in said erect position and generating a ram up condition signal;

(d) door detector means for electrically detecting a door open condition of said roof door in which said roof door and said door opening are open and generating a door open signal;

(e) a ram control means for electrically controlling said ram to move said mast and instrument from said stowed position to said erect position in response to said ram up switch signal and said door open signal; and (f) mast control means for electrically controlling said mast operator to extend said mast from said telescoped retracted position to said telescoped extended position in response to said ram up condition signal and said mast extend switch signal.

2. The system of claim 1 including:
(a) mast condition detector means for electrically detecting when said mast is in said telescoped retracted configuration and generating a mast retracted condition signal; and
(b) said ram control means controlling said ram to move said mast to said stowed position in response to said ram down switch signal, said mast retracted condition signal, and said door open signal.

3. The system of claim 2 including:
(a) instrument detector means for electrically detecting a undeployed condition of said instrument in which said instrument is inoperative and generating a undeployed instrument signal; and
(b) said ram control means controlling said ram in further response to said undeployed instrument signal to move said mast to said mast stowed position.

4. The system of claim 1 including:
(a) instrument detector means for electrically detecting an undeployed condition of said instrument in which said instrument is unoperative; and
(b) said ram control means controlling said ram in further response to said undeployed instrument signal to move said ram to said erect position.

5. The system of claim 1 wherein said door detector means further detects a door closed condition of said roof door in which said roof door and door opening are closed for generating a door closed signal.

6. The system of claim 1 wherein said ram switch means and said mast switch means are manually operated so that a vehicle operator may establish that prescribed conditions have been established before sequentially activating said ram and mast operator.

7. The system of claim 1 wherein said leveling system includes:
(a) a jack arrange generally adjacent the corners of the vehicle diagonally along an X-axis of the vehicle, each jack having a retracted position in which the jack may be locked and unlocked and an extended position in which an unlocked retracted jack is extended against the ground;
(b) level sensor means sensing the level condition of said vehicle at said diagonally arranged jacks for generating an electrical level condition signal representing the levelness of said vehicle near its corners; and (c) a jack leveling logic circuit receiving said level condition signals and electrically controlling said jacks for interactively extending and retracting said jacks to maintain said vehicle in a prescribed level condition with said mast extended and instrument elevated during surveillance operations.

8. The system of claim 7 including:

(a) jack pressure sensors carried adjacent said jacks for sensing the pressure of said jacks against the ground and generating jack pressure signals; and (b) pressure control circuit means receiving said jack pressure signals for generating pressure control signals which are transmitted to said leveling logic circuit to control said jack drive means to extend and retract said jacks in order to maintain a prescribed pressure on said jacks against said ground.

9. A control system for a rapid deployment surveillance vehicle having a vehicle cab with a roof door through which an instrument for surveillance and the like may be deployed from a concealed stowed position within said vehicle cab to an elevated position extended through a door opening of said roof door high above the vehicle; said vehicle being of the type having a telescoping mast which has a telescoped retracted position and a telescoped extended position; a ram for moving the retracted mast between a generally horizontal stowed position and vertical erect position; a mast operator for moving said mast between said telescoped retracted and extended positions; a leveling system with a jack generally adjacent each corner along an X-axis of the vehicle, each jack having a retracted position and an extended position against the ground; said control system comprising:

(a) electrical ram switch means electrically connected to said ram control means for producing a ram up signal and ram down signal for switching said ram control means to move said mast;

(b) a ram control means for electrically controlling said ram to move said mast from said concealed stowed position to said erect position in response to said ram up switch signal;

(c) electrical mast switch means electrically connected to said mast control system for producing a mast extend signal and a mast retract signal for switching said mast control means to move said mast;

(d) a mast control means for electrically controlling said mast operator to extend said mast and instrument from said telescoped retracted position to said telescoped extended position above said vehicle cab in response to said mast up switch signal;

(e) electrical jack switch means for generating a jack extend signal for activating said leveling system to extend said jacks;

(f) said mast control means controlling said mast operator to move said mast to said extended position in response to said mast extend switch signal and said jack extend signal.

10. The control system of claim 9 wherein said leveling system includes:

(a) level sensors for sensing the levelness of said vehicle and generating level condition signals;

(b) a level limit detector circuit receiving said level condition signals and comparing said level condition signals to a leveling capacity signal representing a known capacity of said leveling system to level said vehicle, said level limit detector means generating an electrical level limit signal if the level condition of said vehicle is within the leveling capacity of said leveling system; and (c) said mast control means receiving said level limit signal which disables said mast control means to prevent extension of said mast to said telescoped extended position.

11. The system of claim 9 including:

(a) a high voltage detector for detecting adverse high voltage conditions in the ambient environment surrounding said vehicle and generating an electrical high voltage signal; and (b) said mast control means controlling said mast operator to abort movement of said mast to said extended position in response to said high voltage signal.

12. A control system for a rapid deployment surveillance vehicle having a vehicle cab with a roof door through which an instrument for surveillance and the like may be deployed from a concealed stowed position within said vehicle cab to an elevated position extended through a door opening of said roof door high above the vehicle; said vehicle being of the type having a telescoping mast which has a telescoped retracted position and a telescoped extended position; a ram for moving the retracted mast between a generally horizontal stowed position and vertical erect position; a mast operator for moving said mast between said telescoped retracted and extended positions; a leveling system with a jack generally adjacent each corner along an X-axis of the vehicle, each jack having a retracted position in which the jack may be locked and unlocked by a jack lock and an extended position in which an unlocked retracted jack is extended against the ground; said control system comprising:

(a) ram control means for electrically controlling said ram to move said mast between said stowed position and said erect position;

(b) electrical ram switch means electrically connected to said ram control means for producing a ram up signal and ram down signal for switching said ram control means to move said mast;

(c) mast control means for electrically controlling said mast operator to move said mast between said telescoped retracted configuration and said telescoped extended configuration;

(d) electrical mast switch means electrically connected to said mast control system for producing a mast extend signal and a mast retract signal for switching said mast control means to move said mast;

(e) jack drive means for extending and retracting said jacks relative to said vehicle;

(f) a level control means which includes a leveling condition circuit for electrically determining an unlocked condition of said jack locks and generating an electrical jack unlocked signal which is delivered to said leveling control means to provide extension power for said leveling system to control said jack drive means for extending and retracting said jacks;

(g) level sensor means for sensing a level condition of the corners of said vehicle near said jacks and generating electrical off-level condition signals; and (h) a jack leveling logic circuit included in said level control means responsive to said jack unlocked signal and said level condition signals for electrically controlling said jack drive means in response to said off-level condition signals to interactively retract and extend said jacks to continuously maintain said vehicle in a prescribed level condition with said mast extended during surveillance operation.

13. The system of claim 12 wherein said jack leveling logic circuit controls the jack drive means in response to said off-level condition signals to extend and retract said jacks disposed along said X-axis in diagonally opposed front and rear pairs simultaneously and interactively to level said corners of said vehicle to within said prescribed level conditions.

14. The system of claim 13 including:
   (a) pressure sensors for sensing the pressure of said extended jacks against the ground and generating jack pressure signals representing said pressure; and
   (b) said jack level logic circuit controls said jack drive means in response to said off-level condition signals to extend and retract said jacks until said prescribed level condition is initially established, and said level logic circuit continues to control said jack drive means after said initial level condition is established in response to said pressure control signals until said jack pressure sensors generate an actual jack pressure signal indicating that a preset system pressure has been reached on said jacks.

15. The system of claim 13 wherein said jack leveling logic circuit is constructed and arranged to control said jack drive means to move said jacks in diagonally opposed pairs of front and rear corner jacks, said jack leveling logic circuit controlling said jack drive means in response to an off-level condition signal indicating a low corner and diagonally opposed high corner to retract a high corner jack and extend a low corner jack until said prescribed level condition signal has been generated.

16. The system of claim 15 wherein said jack leveling logic circuit extends said high corner jack when said jack pressure signal from said high corner jack is below said preset pressure and said low corner jack has reached said prescribed level condition.

17. The system of claim 12 including:
   (a) pressure sensors for sensing the pressure of said extended jacks against the ground and generating jack pressure signals representing said pressure; and
   (b) said jack leveling logic circuit continuously receiving said jack pressure signals and said off-level condition signals while said surveillance device is operating for controlling said jack drive means to continuously maintain said prescribed level condition of said vehicle and pressure of said jacks against the ground.

18. The system of claim 12 including jack switch means included in said leveling control means for producing a jack extend signal for activating said leveling logic means and jack drive, said jack switch means producing a jack retract signal for controlling said jack drive to retract said jacks, and said mast control means receiving said jack extend signal as a condition for controlling said mast operator to extend said mast.

19. The system of claim 12 including lock/unlock means for unlocking said jack locks in response to said jack extend signal.

20. The system of claim 12 including a park detector for detecting a parked and locked condition of a drive transmission of said vehicle, and generating a vehicle parked signal which is transmitted to said leveling condition circuit.

21. A control system for a rapid deployment surveillance vehicle having a vehicle cab with a roof door through which an instrument for surveillance and the like may be deployed from a concealed stowed position within said vehicle cab to an elevated position extended through a door opening of said roof door high above the vehicle; said vehicle being of the type having a telescoping mast which has a telescoped retracted position and a telescoped extended position; a ram for moving the retracted mast between a generally horizontal stowed position and vertical erect position; a mast operator for moving said mast between said telescoped retracted and extended positions; a leveling system with a jack generally adjacent each corner along an X-axis of the vehicle, each jack having a retracted position in which the jack may be locked and unlocked and an extended position in which an unlocked retracted jack is extended against the ground; said control system comprising:
   (a) ram control means for moving said mast between said stowed position and said erect position;
   (b) mast control means for moving said mast between said telescoped retracted configuration and said telescoped extended configuration in response to said mast being moved to said erect position;
   (c) jack drive means for extending and retracting said jacks relative to said vehicle;
   (d) a level control means which includes a leveling condition circuit for electrically determining a prescribed condition of said jacks and vehicle and generating an electrical conditions satisfied signal which is delivered to said level control means to provide extension power for said leveling system to control said jack drive means for extending and retracting said jacks;
   (e) level sensor means for sensing a level condition of the corners of said vehicle near said jacks and generating electrical off-level signals when a low corner condition exists; and
   (f) a jack leveling logic means included in said level control means responsive to said conditions satisfied signal and said off-level signals for electrically controlling said jack drive means in response to said off-level signals to interactively retract and extend said jacks to continuously maintain said vehicle in a prescribed level condition with said mast extended during surveillance operation.

22. The system of claim 21 including:
   (a) means for sensing a jack pressure of said jacks against the ground and generating first pressure control signals if said jack pressure is below a preset pressure and a second pressure control signal if said jack pressure is greater than or equal to said preset pressure;
   (b) said leveling logic means controlling said jack drive to extend a low corner jack near a low corner in response to an off-level signal from said low corner and a first pressure signal from a high corner diagonally opposite said low corner; and
   (c) said leveling logic circuit means controlling said jack drive to retract said high corner jack in response to an off-level signal from said low corner and a second pressure signal from said high corner jack.

23. The system of claim 21 including:

emergency switch means connected to said leveling condition circuit; and said switch means having an emergency mode of operation energized by switch means which interrupts power to said level control means to override said leveling logic means causing immediate retraction of said vehicle jacks and interrupts power to mast and ram control means causing immediate retraction of said mast and said ram whereby the vehicle may be driven as soon as the jacks are retracted and brakes unlocked for quick escape under emergency conditions and the like.

24. A control system for controlling a leveling system for a four wheel vehicle and the like, said leveling system having a mechanical jack system with a jack arranged diagonally near the four corners of an x-axis of the vehicle, a jack drive for extending and retracting said jacks, level sensor means for sensing the level condition of the vehicle near the corners and generating an off-level signal at a corner when the level condition of said corner deviates from a prescribed vehicle level condition, pressure sensor means for sensing the amount of pressure of said jacks against the ground and generating a jack pressure signal for each jack, preset means for establishing a desired system reference pressure signal representing a desired jack pressure against the ground, a pressure control means for comparing said jack pressure signals and said reference pressure signal and generating jack pressure control signals, said leveling logic circuit controlling pairs of first and second jacks at first and second opposed diagonal corners of said diagonals opposing interactively to balance said vehicle along each diagonal simultaneously, and said leveling logic circuit comprising for controlling each pair of said first and second jacks:

(a) a first level sensor at said first corner for producing a first off-level signal, and a second level sensor at said second corner for producing a second off-level signal;

(b) a first jack pressure signal generated in response to said pressure of said first jack against the ground, and a second jack pressure signal generated in response to said pressure of said second jack against the ground;

(c) a first level circuit which receives said second off-level signal from said second diagonal corner of said vehicle axis;

(d) a second level circuit which receives said first off-level signal from said first diagonal corner of said vehicle axis;

(e) a first pressure circuit which receives said first jack pressure signals;

(f) a second pressure circuit which receives said second jack pressure signals;

(g) said first level circuit being connected to said second pressure circuit, and said second pressure circuit being connected to said jack drive for extending said second jack in response to said second off-level signal being received by said first level circuit;

(h) said second level circuit being connected to said first pressure circuit, and said first pressure circuit being connected to said jack drive for extending said first jack in response to said first off-level signal being received by said second level circuit;

(i) said first pressure circuit being connected to control said jack drive to extend said first jack in response to said first pressure control signal, and said first pressure circuit is responsive to said first pressure control signal and said second off-level signal to control said jack drive to retract said first jack; and (j) said second pressure circuit being connected to said jack drive to extend said second jack in response to said second pressure control signal, and said second pressure circuit is responsive to said second pressure control signal and said first off-level signal to control said jack drive to retract said second jack.

25. The control system of claim 24 wherein said first and second level circuits each include:

(a) a first logic circuit;

(b) said first logic circuit of said second level circuit being connected to said first level circuit and said second pressure circuit for transmitting a drive signal to said second jack in response to said second off level signal; and (c) said first logic circuit of said first level circuit being connected to said second level circuit and said first pressure circuit for transmitting a drive signal to said first jack in response to said first off-level signal.

26. The system of claim 25 wherein said first and second level circuits each further include a second logic circuit for interrupting and disabling said first logic circuits of said first and second level circuits in response to said first and second off-level signals being received respectively by said first and second level circuits.

27. The system of claim 24 wherein said first pressure circuit includes:

(a) a first logic circuit and a second logic circuit, said first logic circuit having an input connected to said first level circuit and a first output connected to said jack drive for retracting said first jack in response to said first pressure signal being greater than or equal to said system pressure and said second off-level signal, and said first logic circuit having a second output connected to said second level circuit and said jack drive for extending said second jack in response to said first pressure signal being less than said system pressure and said second off-level signal; and s id second logic circuit of said first pressure circuit having an input connected to said first level circuit and an output connected to said jack drive for extending said first jack.

28. The control system of claim 24 wherein said second pressure circuit includes:

(a) a first logic circuit and a second logic circuit, said first logic circuit having an input connected to said second level circuit and a first output connected to said jack drive for retracting said second jack in response to said second pressure signal being greater than or equal to said system pressure and said first off-level signal, said first logic circuit having a second output connected to said first level circuit and said jack drive for extending said first jack in response to said second pressure signal being less than said system pressure and said first off-level signal; and said second logic circuit of said second pressure circuit having an input connected to said second level circuit and an output connected to said jack drive for extending said second jack.

29. A vehicle leveling control system having a level logic circuit for controlling a jack drive of a mechanical jack system having four jacks arranged near diagonally opposed corners of an x-axis of said vehicle, level sensor means for sensing the level condition of the vehicle near the corners and generating an off-level signal when the level condition diviates from a prescribed vehicle level condition, pressure sensor means for sensing the pressure of said jacks against the ground and generating a actual pressure signal representing the amount of pressure of each said jack against the ground, preset means for setting a desired system reference pressure corresponding to a desired jack pressure against the ground, and a pressure control means for comparing said actual jack pressure of each said jack and said system reference pressure and generating pressure control signals, said circuit comprising for each diagonal of said axis:

(a) a leveling logic circuit means for controlling said jack drives;
(b) said logic circuit means including inputs for receiving said pressure control signals and said off-level signals and outputs connected to said jack drives of diagonally opposed jacks to interactively extend and retract said jacks of diagonally opposed pairs near diagonal corners of said vehicle; and
(c) said logic circuit means constructed and arranged to control said jack drives for balancing said vehicle about a point at which said diagonal axes intersect to establish a prescribed level condition and said preset system pressure of said jacks against the ground in response to said off-level signals and said pressure control signals.

30. The system of claim 29 including:
(a) means for sensing a jack pressure of said jacks against the ground and generating first pressure control signals if said jack pressure is below a preset pressure and a second pressure control signal if said jack pressure is greater than or equal to said preset pressure;
(b) said leveling logic circuit means controlling said jack drive to extend to a low corner jack near a low corner in response to an off-level signal from said low corner and a first pressure signal from a high corner diagonally opposite said low corner; and
(c) said leveling logic circuit means controlling said jack drive to retract said high corner jack in response to an off-level signal from said low corner and a second pressure signal from said high corner jack.

31. A method for controlling a rapid deployment surveillance vehicle having a vehicle cab with a roof door through which an instrument for surveillance and the like may be deployed from a concealed stowed position within said vehicle cab to an elevated position extending through a door opening of said roof door above the vehicle cab; said vehicle having a telescoping mast which has a retracted position and a telescoped extended position; a mast operator for moving said mast between said retracted and extended positions; a ram for moving the retracted mast between a generally horizontal stowed position and vertical erect position; a leveling system having a jack generally adjacent each corner of the vehicle, said method comprising:
(a) parking said vehicle at a surveillance site;
(b) opening said roof door and generating an electrical door open signal;
(c) controlling said ram in response to said door open signal to move said mast from said stowed position to said erect position;
(d) detecting the position of said mast in said erect position and generating a mast erect signal;

(e) sensing the level condition of said vehicle and generating level condition signals;
(f) activating said leveling system in response to a jack activation signal;
(g) leveling said vehicle after activation of said leveling system by operating said jack drive to extend or retract said jacks at said corners of said vehicle until said level condition signal is generally equal to a prescribed level signal indicating a prescribed level condition is reached;
(h) extending said mast from said retracted position to said extended position in response to said mast erect signal and said jack activation signal;
(i) moving said instrument into an operational position for surveillance operations;
(j) continuously monitoring said level condition of said vehicle during surveillance with said mast extended and said instrument in said operational position and generating said level condition signals;
(k) controlling said jack drive means continuously during said surveillance in response to said level condition signals while said mast is extended to continuously maintain said vehicle within said prescribed level conditions during said surveillance operation;
(l) controlling said mast operator to retract said mast after said surveillance operation is completed;
(m) detecting said retracted mast when moved to said retracted position and generating a mast retracted signal; and
(n) controlling said ram in response to said mast retracted signal and said door open signal to move said mast from said vertically erect position to said generally horizontal stowed position within said vehicle cab.

32. The method of claim 31 including detecting said roof door being moved to said open position and controlling said ram in response to detecting said door being moved to said open position to move said mast to said erect position.

33. The method of claim 31 including:
(a) locking said jacks in a retracted position when said leveling system is deactivated;
(b) unlocking said jacks at each surveillance site in response to a leveling system deactivation signal;
(c) generating a jack unlocked signal in response to the unlocking of said jack upon activation of said leveling system;
(d) braking said vehicle at said surveillance site prior to extension of said jacks of said leveling systems and generating a jack unlocked signal and a brake locked signal; and
(e) extending said jacks in response to said jack signal and said brake locked signal.

34. The method of claim 33 including monitoring said pressure of said jacks against the ground and continuously controlling said leveling system by extending said jacks until a set pressure is reached.

35. The method of claim 31 including controlling diagonally opposed front and rear jacks together during leveling of said vehicle in an interactive manner so that a high jack at a high corner of said vehicle is retracted and a low jack of a low corner of said vehicle is extended simultaneously until said prescribed level condition is reached, and thereafter, said high and low corner jacks are extended until said prescribed pressure is reached.

36. The method of claim 31 including monitoring the ambient environment to detect whether a high voltage condition exists in the environment, avoiding extension of said mast to said elevation position in the event a high voltage condition is detected.

37. The method of claim 31 including detecting a parked condition of said vehicle in which a park lever of a power transmission of the vehicle is in a parked position and activating said leveling system when said park condition is detected.

38. The method of claim 31 including controlling said leveling system to retract said jacks in response to said mast being moved to said telescope, retracted position;
 (a) detecting said jacks reaching a retracted position; and
 (b) operating said jack locks to lock said jacks in said retracted position.

39. The method of claim 31 including closing said roof door upon said mast being moved to said erect position, maintaining said door closed during said surveillance operation; and opening said roof door in response to said mast being moved to said telescoped, retracted configuration and prior to said ram being operated to move said erect mast to said concealed configuration.

40. A method of controlling a leveling system of a four wheel vehicle and the like, said leveling system having a mechanical jack system with jacks arranged diagonally at corners of an x-axis of the vehicle, a jack drive for extending and retracting said jacks, level sensor means for sensing the level condition of the vehicle near the corners and generating an off-level signal at a corner when the level condition of said corner deviates from a prescribed vehicle level condition, pressure control means for sensing the amount of jack pressure of said jacks against the ground and generating a first pressure control signal if said jack pressure is below a preset pressure and generating a second pressure control signal if said jack pressure is greater than or equal to said preset said method comprising processing said off-level signals and said first and second pressure control signals to control said jack drive by:
 (a) extending a low corner jack near a low corner in response to an off-level signal from said low corner and a first pressure signal from a high corner diagonally opposite said low corner;
 (b) extending said high corner jack in response to a first pressure control signal from said high corner and said off-level signal from said lower corner;
 (c) retracting said high corner jack in response to a second pressure control signal from said high corner and said off-level signal from said low corner;
 (d) terminating extension of said low corner jack when the off-level signal is terminated; and
 (e) terminating the extension and retraction of said high corner jack when said preset pressure is reached on said high corner jack.

41. A method of leveling a vehicle having jacks arranged near diagonally opposed corners of said vehicle having level sensors near said corners for sensing an off-level condition and generating an off-level signal and pressure sensor for sensing actual jack pressure of said jacks against the ground, said method comprising:
 (a) controlling a low corner and a high corner jack at said diagonally opposed corners in response to an off-level signal at said low corner by first determining whether said jack pressure is greater or less than a preset pressure, if greater than said preset pressure, retracting said high corner jack, and if less than preset pressure, extending the low corner jack until said jack pressure of high corner jack is greater than or equal to said preset pressure, or said off-level signal is terminated;
 (b) controlling the low corner and high corner jacks when jack pressure on the high corner jack is greater or equal to the preset pressure by retracting said high corner jack until jack pressure is below preset pressure;
 (c) extending said low corner jack until said off-level signal is terminated or said high corner jack pressure is greater or equal to preset pressure:
 (d) repeating the steps (a)-(c) if said high corner jack pressure is greater or equal to the preset pressure until the off-level signal is terminated; and
 (e) terminating the steps (a)-(c) if said low corner jack extension is terminated in response to the off-level signal termination.

42. The method of claim 40 including:
 (a) controlling the jack drive in an absence of said off-level signals and in response to a jack pressure of at least one corner jack being less than said preset pressure by extending said jack until said jack pressure is equal to preset pressure.

* * * * *